US012608119B2

(12) United States Patent
Mandrino

(10) Patent No.: US 12,608,119 B2
(45) Date of Patent: Apr. 21, 2026

(54) SYSTEMS AND METHODS FOR USER INTERFACE NAVIGATION

(71) Applicant: Electronic Arts, Inc., Redwood City, CA (US)

(72) Inventor: Liliia Mandrino, Georgetown, TX (US)

(73) Assignee: Electronic Arts Inc., Redwood City, CA (US)

( * ) Notice: Subject to any disclaimer, the term of this patent is extended or adjusted under 35 U.S.C. 154(b) by 221 days.

(21) Appl. No.: 18/621,759

(22) Filed: Mar. 29, 2024

(65) Prior Publication Data

US 2024/0329806 A1 Oct. 3, 2024

Related U.S. Application Data

(60) Provisional application No. 63/455,742, filed on Mar. 30, 2023.

(51) Int. Cl.
 *A63F 13/25* (2014.01)
 *G06F 3/0482* (2013.01)
 *H04L 67/306* (2022.01)

(52) U.S. Cl.
 CPC ............ *G06F 3/0482* (2013.01); *A63F 13/25* (2014.09); *H04L 67/306* (2013.01); *A63F 2300/308* (2013.01)

(58) Field of Classification Search
 CPC .. G06F 3/0482; A63F 13/25; A63F 2300/308; A63F 13/533; H04L 67/306
 See application file for complete search history.

(56) References Cited

U.S. PATENT DOCUMENTS

| | | | |
|---|---|---|---|
| 2009/0034931 A1* | 2/2009 | Stone | G11B 27/105 386/E5.064 |
| 2012/0259966 A1* | 10/2012 | Ishii | H04L 41/12 709/223 |
| 2013/0198690 A1* | 8/2013 | Barsoum | G06F 3/0482 715/822 |
| 2017/0076503 A1* | 3/2017 | Tamaoki | G06F 3/017 |
| 2023/0068734 A1* | 3/2023 | Sharda | A63F 13/5375 |
| 2025/0068300 A1* | 2/2025 | Wohlstadter | G06K 7/1413 |

* cited by examiner

*Primary Examiner* — Rinna Yi
(74) *Attorney, Agent, or Firm* — Foley & Lardner LLP

(57) ABSTRACT

Systems and methods for user interface navigation may include a computing system which causes display of a user interface including a set of first user interface elements. The computing system receives a request to expand a switcher menu including a set of second user interface elements including at least one of the first user interface elements. Each second user interface element, when selected within the switcher menu, is displayed with one or more respective third user interface elements. The computing system causes display of a set of third user interface elements corresponding to one of the second user interface elements, and causes, responsive to a second request to navigate from the switcher menu to one of the set of third user interface elements, the switcher menu to collapse and display the second user interface element with at least some of the third user interface elements.

18 Claims, 12 Drawing Sheets

800

SYSTEMS AND METHODS FOR USER INTERFACE NAVIGATION

CROSS-REFERENCE TO RELATED APPLICATIONS

This application claims the benefit of and priority to U.S. Provisional Application No. 63/455,742, filed Mar. 30, 2023, the contents of which are incorporated herein by reference in their entirety.

FIELD OF DISCLOSURE

The present disclosure is generally related to video game applications, including but not limited to, systems and methods for navigating user interfaces of video game applications.

BACKGROUND

Video game applications have increased in popularity and complexity in recent years. Some video game applications may have various gameplay or operational modes, each of which may have corresponding levels of configuration associated therewith. In such video game applications, particularly as the operational modes or number of configurations are scaled, navigating the operational modes and corresponding configuration menus can be complex, unintuitive, and provide excess information which crowds the graphical user interface.

SUMMARY

In one aspect, this disclosure is directed to a system including a data store configured to store video game data corresponding to a video game, and a computing system communicably coupled with the data store and configured to execute computer-readable instructions that configure the computing system to cause display of a user interface including a set of first user interface elements identified from the video game data. The instructions further configure the computing system to receive a request to expand a switcher menu including a set of second user interface elements including at least one of the first user interface elements. Each second user interface element, when selected within the switcher menu, is displayed with one or more respective third user interface elements. The instructions further configure the computing system to cause, responsive to a first request to navigate from one second user interface element to another second user interface element of the switcher menu, display of a set of third user interface elements corresponding to the another second user interface element. The instructions further cause the computing system to cause, responsive to a second request to navigate, from the switcher menu to one of the set of third user interface elements, the switcher menu to collapse and display the another second user interface element with at least some of the set of third user interface elements.

In some embodiments, collapsing of the switcher menu restricts presentation of other ones of the second user interface elements of the set of second user interface elements. In some embodiments, expansion of the switcher menu causes the switcher menu to overlay underlying content of the user interface, and collapsing of the switcher menu causes display of the underlying content of the user interface. In some embodiments, the switcher menu includes a list of shortcut user interface elements corresponding to one or more operational modes, menu items for a respective operational mode, or sub-menu items.

In some embodiments, the set of first user interface elements are arranged along a first axis of the user interface, the set of second user interface elements are arranged along a second axis of the user interface, and the set of third user interface elements are arranged along the first axis of the user interface. In some embodiments, causing display of the set of third user interface elements corresponding to the another second user interface element is performed by replacing the set of first user interface elements with the set of third user interface elements along the first axis. In some embodiments, the computer-readable instructions further configure the computing system to cause display of a set of fourth user interface elements corresponding to respective operational modes of the video game. In some embodiments, the computer-readable instructions further configure the computing system to determine, based on a user profile associated with a user accessing the user interface, a duration of gameplay in respective operational modes of the video game. The instructions may further cause the computing system to cause display of the set of fourth user interface elements in an order, according to the duration of gameplay.

In some embodiments, the computer-readable instructions further configure the computing system to determine, based on a user profile associated with a user accessing the user interface, a selection count for the one or more third user interface elements, and cause display of the set of first user interface elements arranged in an order, according to the selection count. In some embodiments, as the set of third user interface elements are navigated between, one or more of the set of third user interface elements are truncated, the user interface including a truncation element aligned with the remaining third user interface elements, the truncation element indicating a direction of the one or more truncated third user interface elements. In some embodiments, the request to expand, the first request to navigate and the second request to navigate are received based on user inputs to an input device comprising a controller, and the request to expand is received in response to selection of a hotkey on the controller. In some embodiments, the system causes display of the switcher menu at a player computing system.

In another aspect, this disclosure is directed to a method. The method may include causing, by a computing system, display of a user interface including a set of first user interface elements. The method may include receiving, by the computing system, a request to expand a switcher menu including a set of second user interface elements including at least one of the first user interface elements, where each second user interface element, when selected within the switcher menu, is displayed with one or more respective third user interface elements. The method may include causing, by the computing system, responsive to a first request to navigate from one second user interface element to another second user interface element of the switcher menu, display of a set of third user interface elements corresponding to the another second user interface element. The method may include causing, by the computing system, responsive to a second request to navigate, from the switcher menu to one of the set of third user interface elements, the switcher menu to collapse and display the another second user interface element with at least some of the set of third user interface elements.

In some embodiments, expansion of the switcher menu causes the switcher menu to overlay underlying content of the user interface, and collapsing of the switcher menu causes display of the underlying content of the user interface. In some embodiments, the switcher menu includes a list of shortcut user interface elements corresponding to one or more operational modes, menu items for a respective operational mode, or sub-menu items. In some embodiments, the set of first user interface elements are arranged along a first axis of the user interface, the set of second user interface elements are arranged along a second axis of the user interface, and the set of third user interface elements are arranged along the first axis of the user interface. Causing display of the set of third user interface elements corresponding to the another second user interface element may include replacing the set of first user interface elements with the set of third user interface elements along the first axis.

In some embodiments, the method includes determining, by the computing system, based on a user profile associated with a user accessing the user interface, a duration of gameplay in respective operational modes of a video game. The method may include causing, by the computing system, display of a set of fourth user interface elements in an order, according to the duration of gameplay. In some embodiments, the method includes determining, by the computing system, based on a user profile associated with a user accessing the user interface, a selection count for the one or more third user interface elements. The method may include causing, by the computing system, display of the set of first user interface elements arranged in an order, according to the selection count. In some embodiments, as the set of third user interface elements are navigated between, one or more of the set of third user interface elements are truncated, the user interface including a truncation element aligned with the remaining third user interface elements, the truncation element indicating a direction of the one or more truncated third user interface elements.

In yet another aspect, this disclosure is directed to a non-transitory computer readable medium storing instructions that, when executed by a computing system, cause the computing system to cause display of a user interface including a set of first user interface elements. The instructions may cause the computing system to receive a request to expand a switcher menu including a set of second user interface elements including at least one of the first user interface elements, where each second user interface element, when selected within the switcher menu, is displayed with one or more respective third user interface elements. The instructions may cause the computing system to cause, responsive to a first request to navigate from one second user interface element to another second user interface element of the switcher menu, display of a set of third user interface elements corresponding to the another second user interface element. The instructions may cause the computing system to cause, responsive to a second request to navigate, from the switcher menu to one of the set of third user interface elements, the switcher menu to collapse and display the another second user interface element with at least some of the set of third user interface elements.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 1 is a diagram of a networked computing environment for implementing one or more embodiments of a navigational system for video game play configuration, according to an example implementation of the present disclosure.

Figure 2:
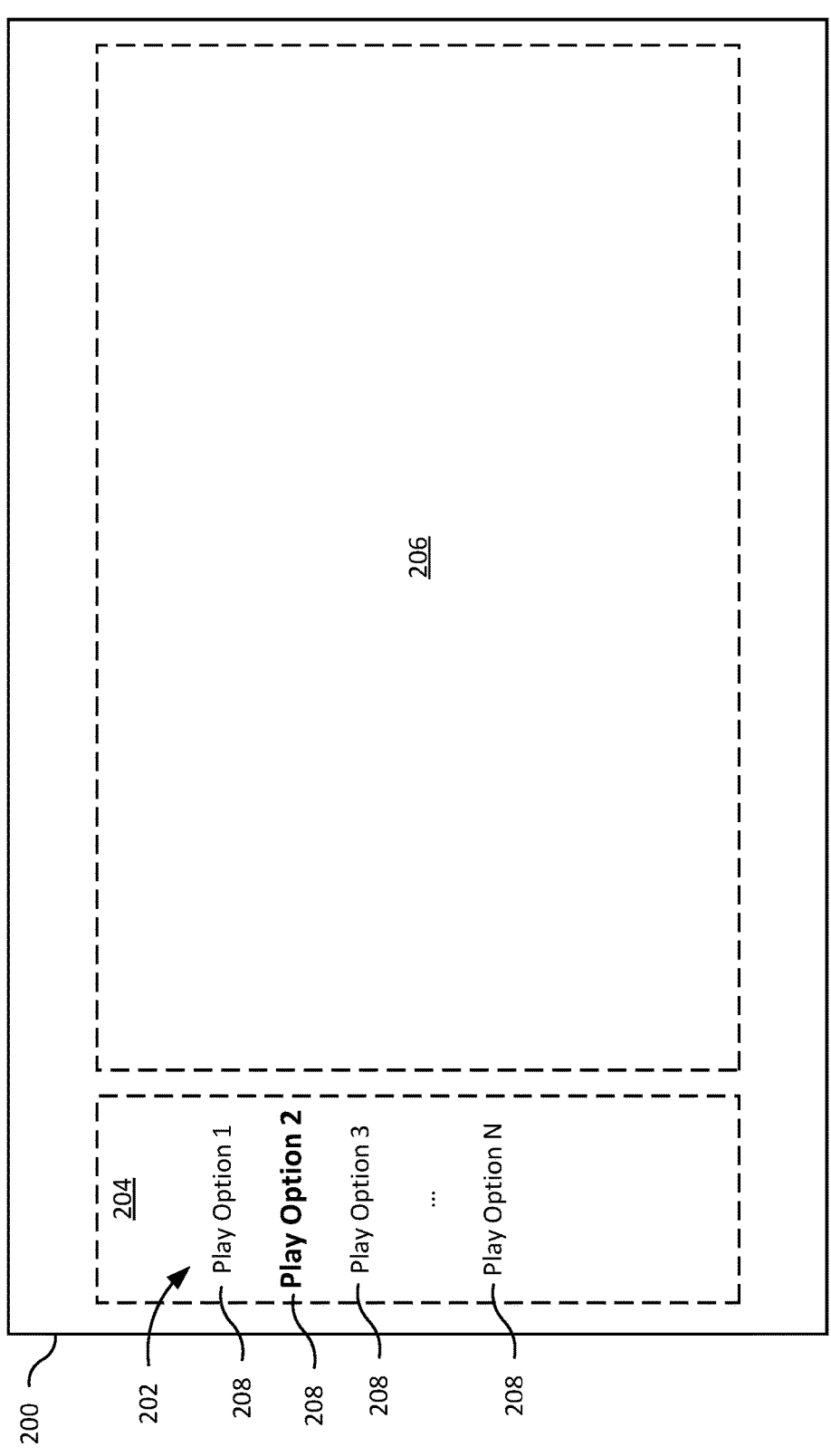

FIG. 2 is an example of a user interface showing a first hierarchy of information displayed thereon, according to an example implementation of the present disclosure.

Figure 3A:
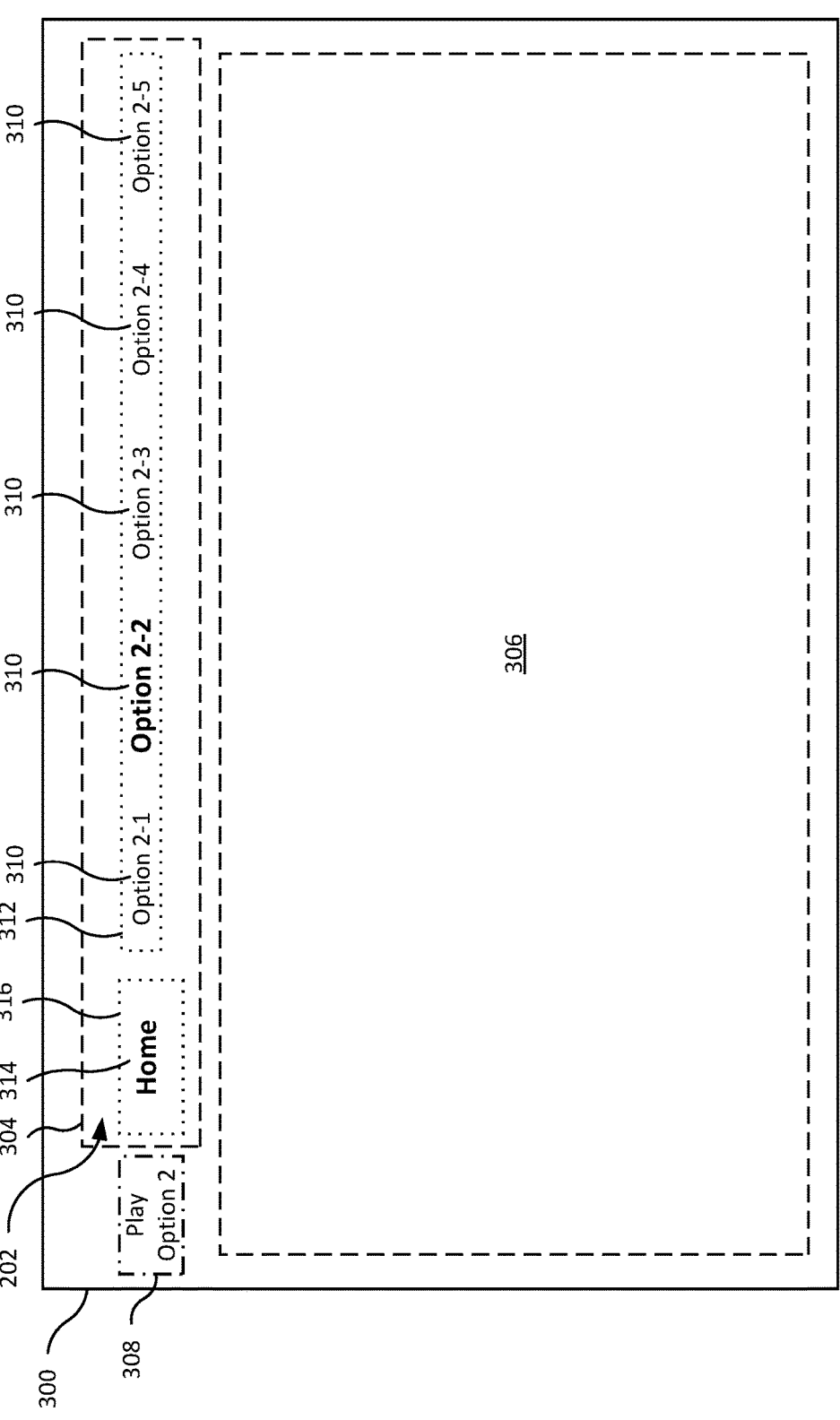
Figures 3B, 3C, 3D, 3E:
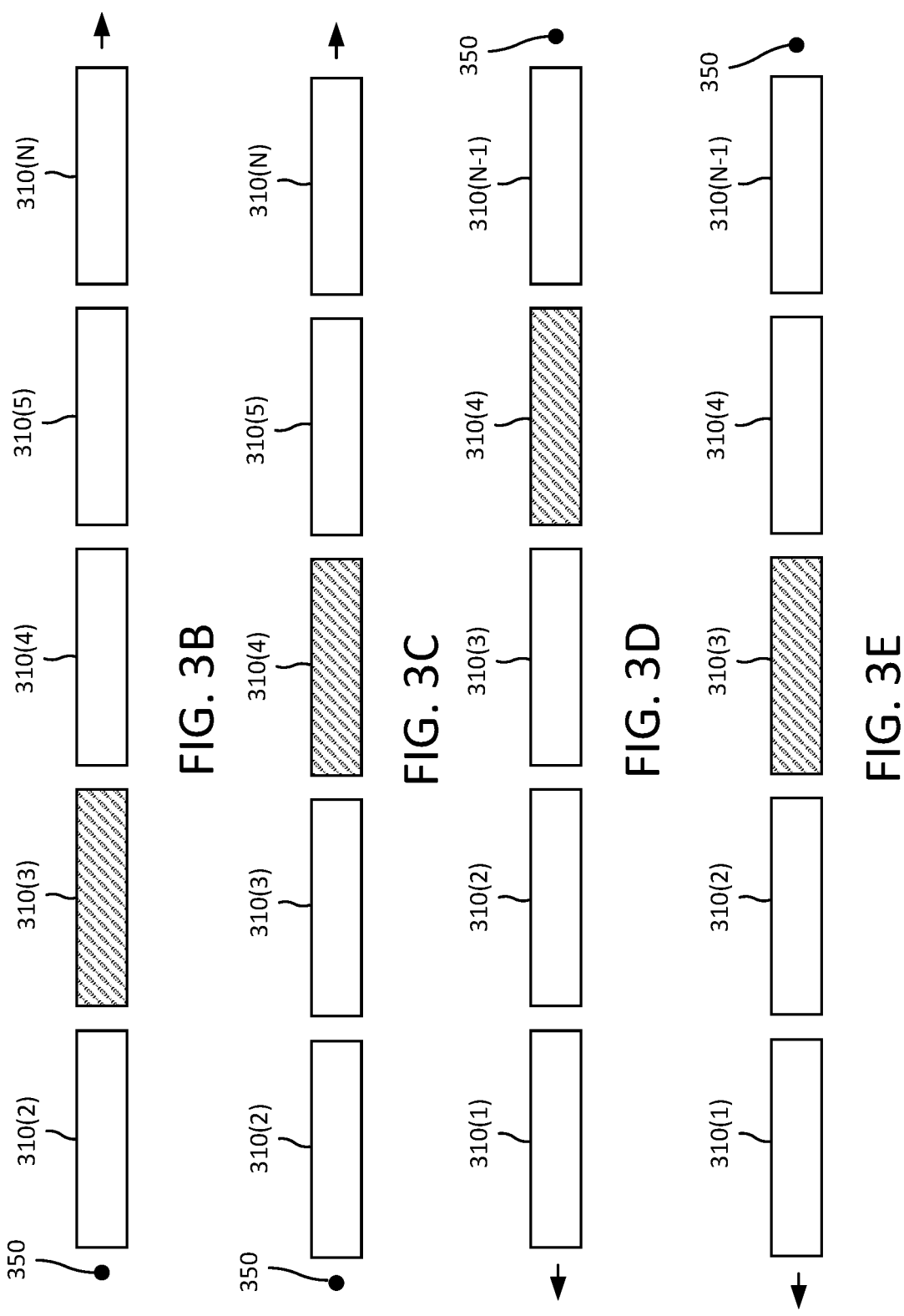

FIG. 3A is an example user interface showing a second hierarchy of information displayed thereon, according to an example implementation of the present disclosure.

FIG. 3B-3E are simplified diagrams illustrating navigating between the second hierarchy of information displayed on the user interface of FIG. 3A, according to an example implementation of the present disclosure.

Figure 4:
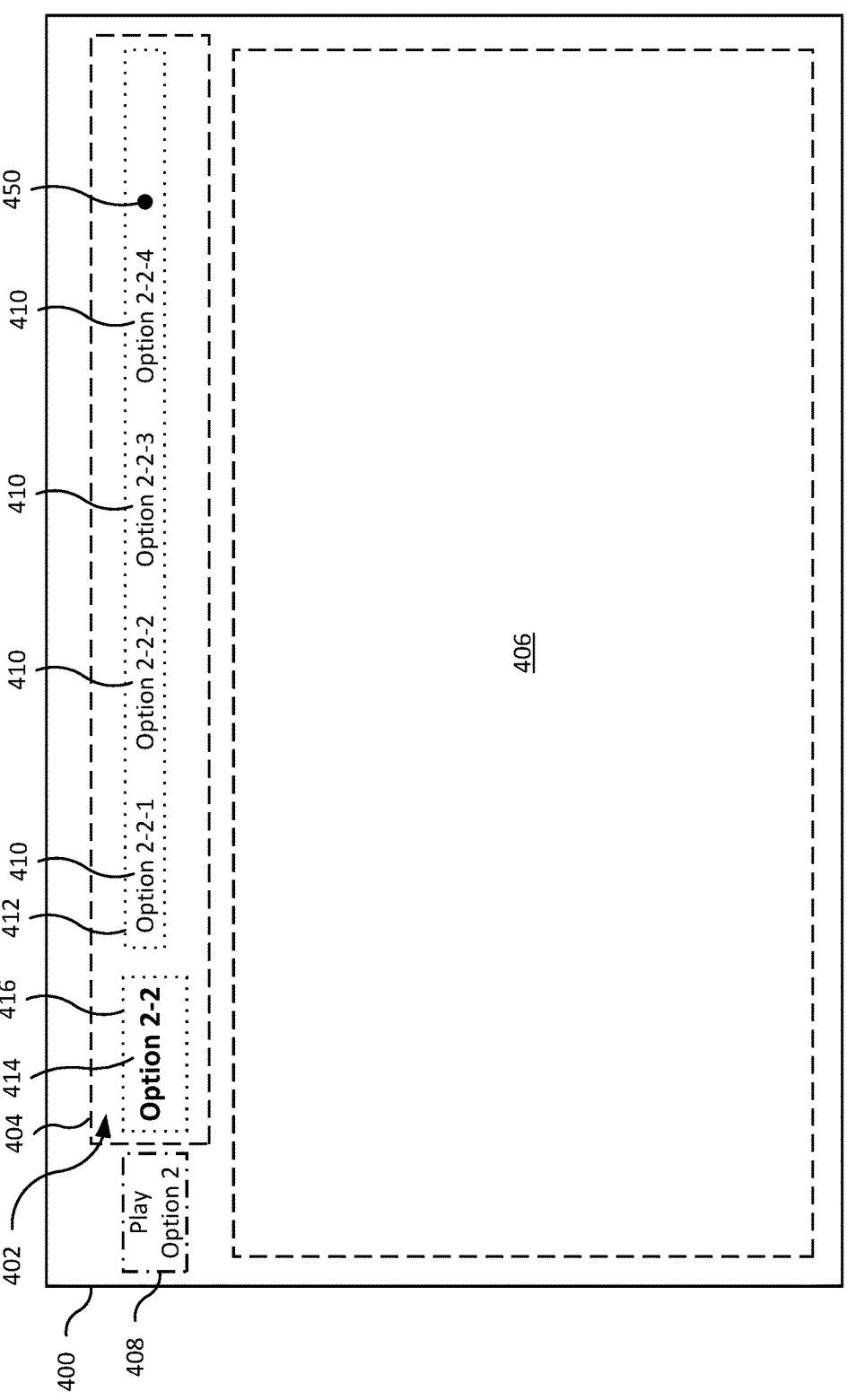

FIG. 4 is an example of a user interface showing a third hierarchy of information, according to an example implementation of the present disclosure.

Figures 5A, 5B:
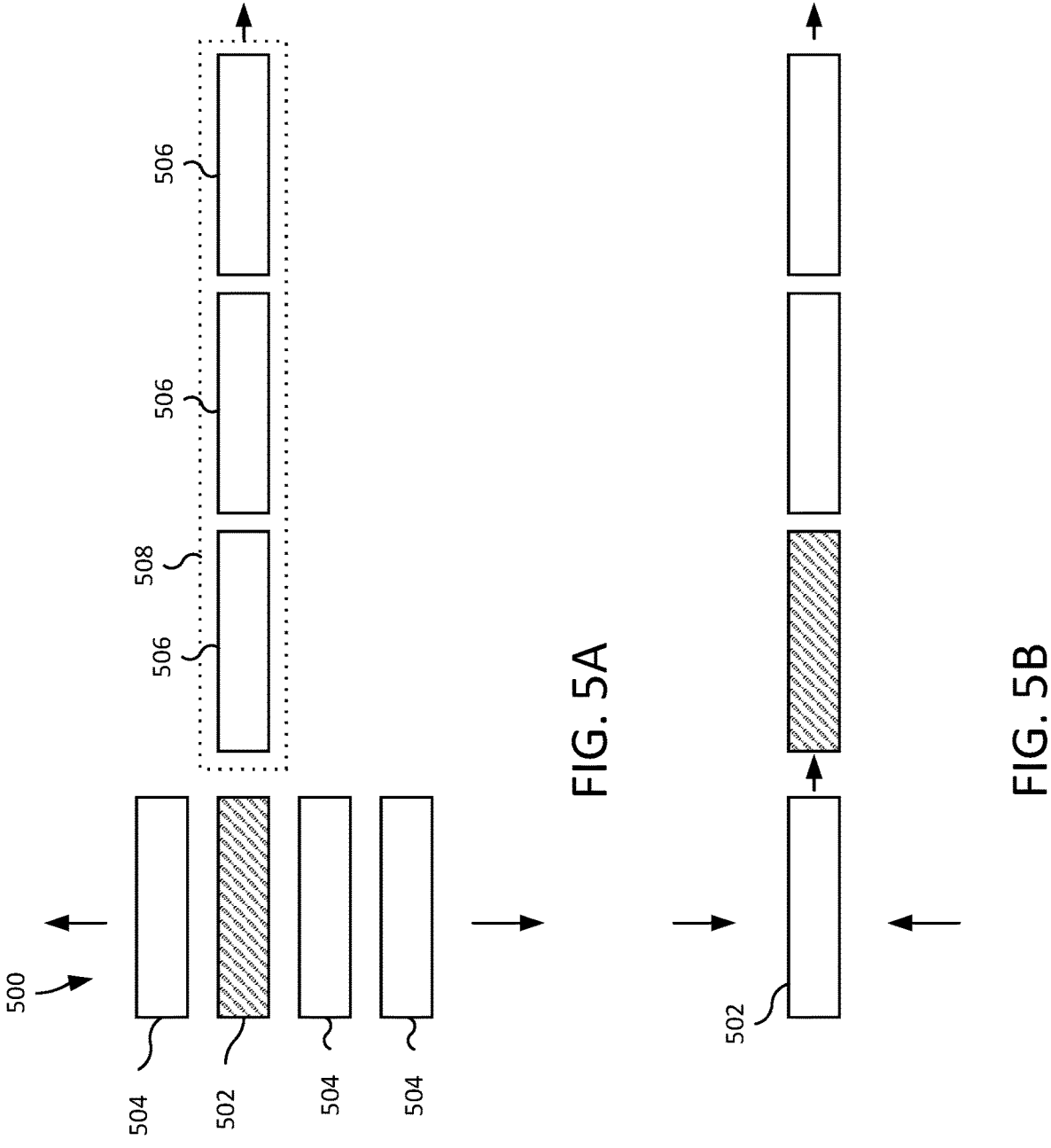

FIG. 5A-5B are simplified diagrams showing a navigation scheme for navigating between a different hierarchies of information using a switcher menu, according to an example implementation of the present disclosure.

Figure 5C:
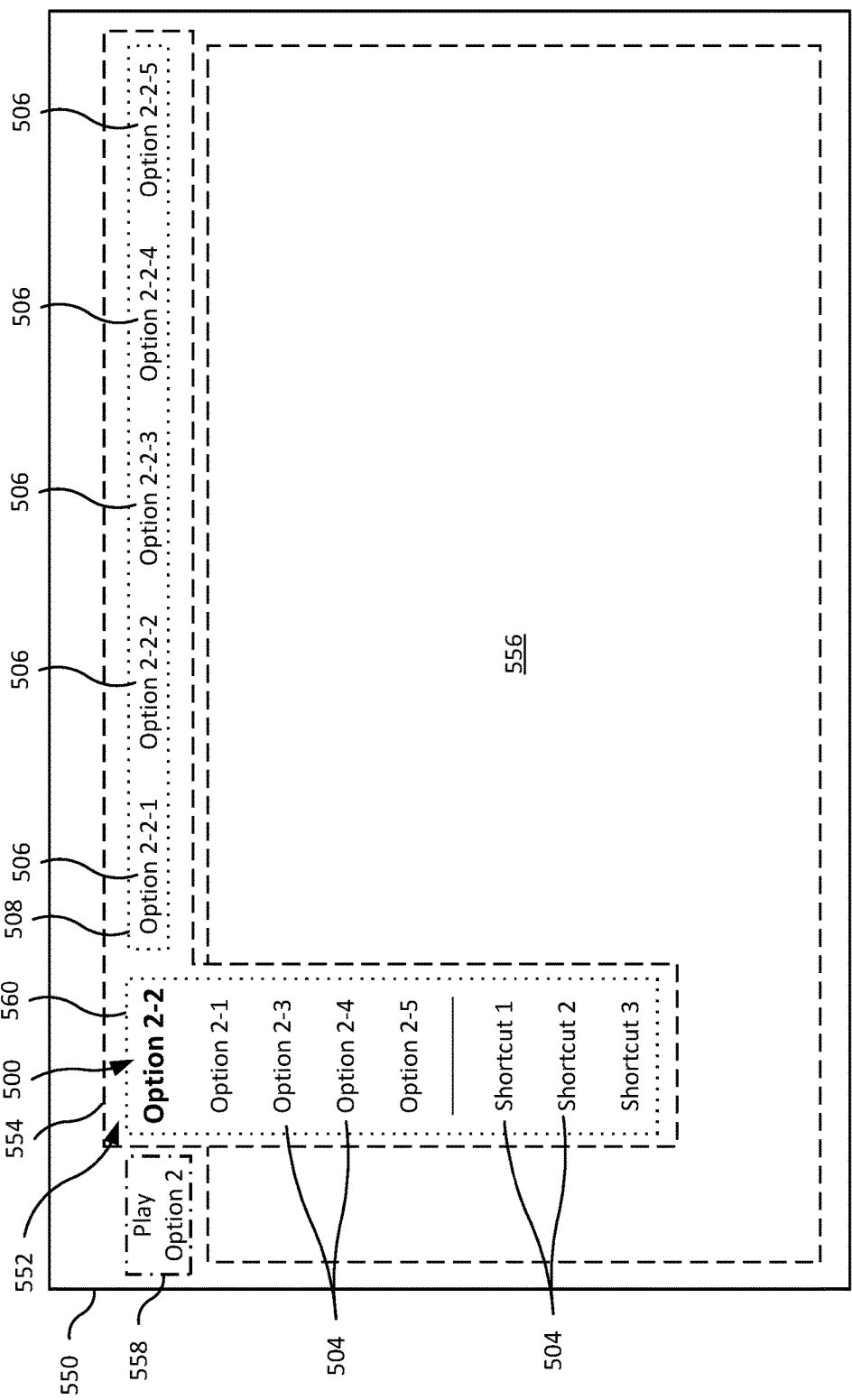

FIG. 5C is an example of a user interface including the switcher menu of FIG. 5A-5B, according to an example implementation of the present disclosure.

Figure 6:
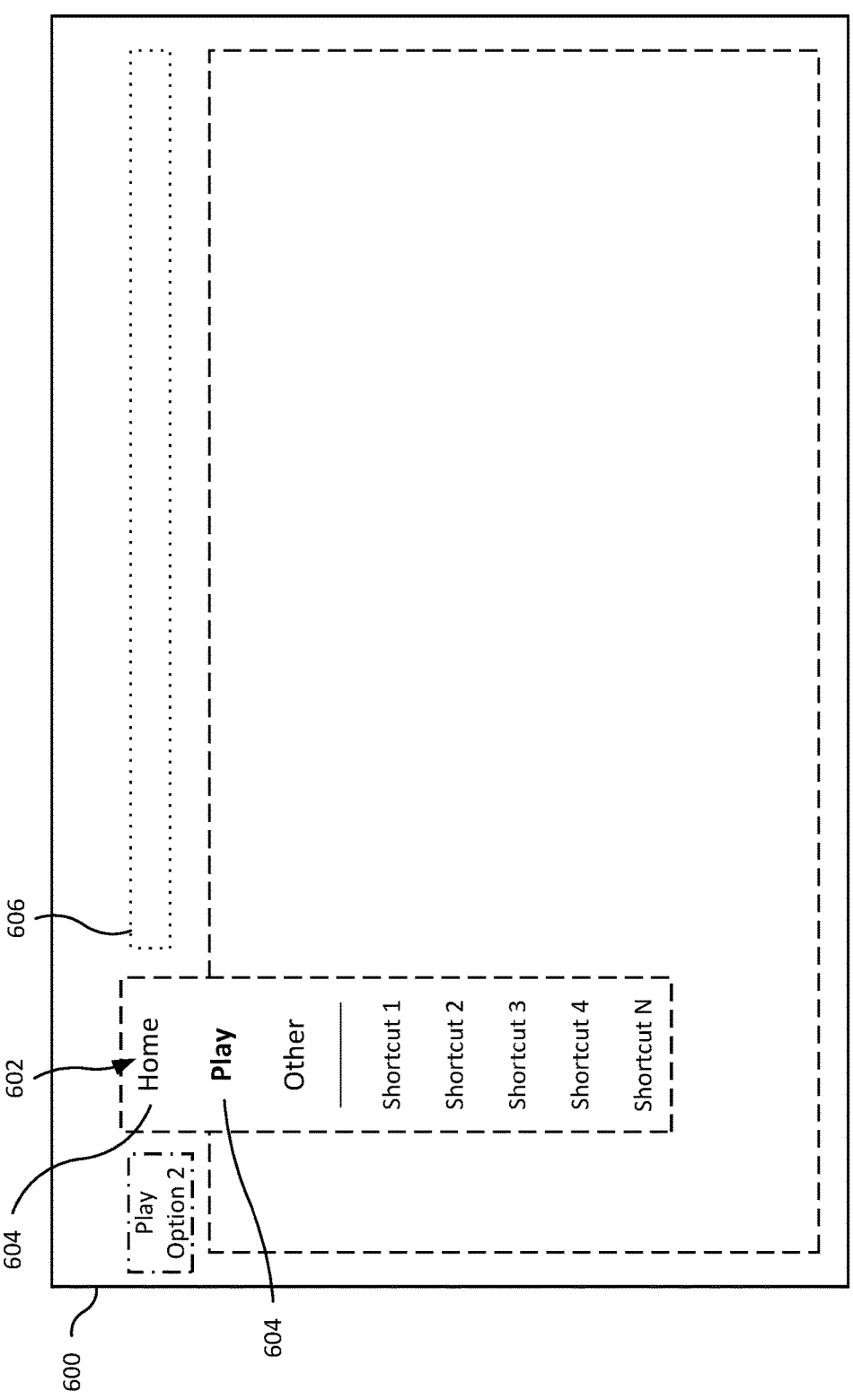

FIG. 6 is another example of a user interface including a switcher menu, according to an example implementation of the present disclosure.

Figure 7A:
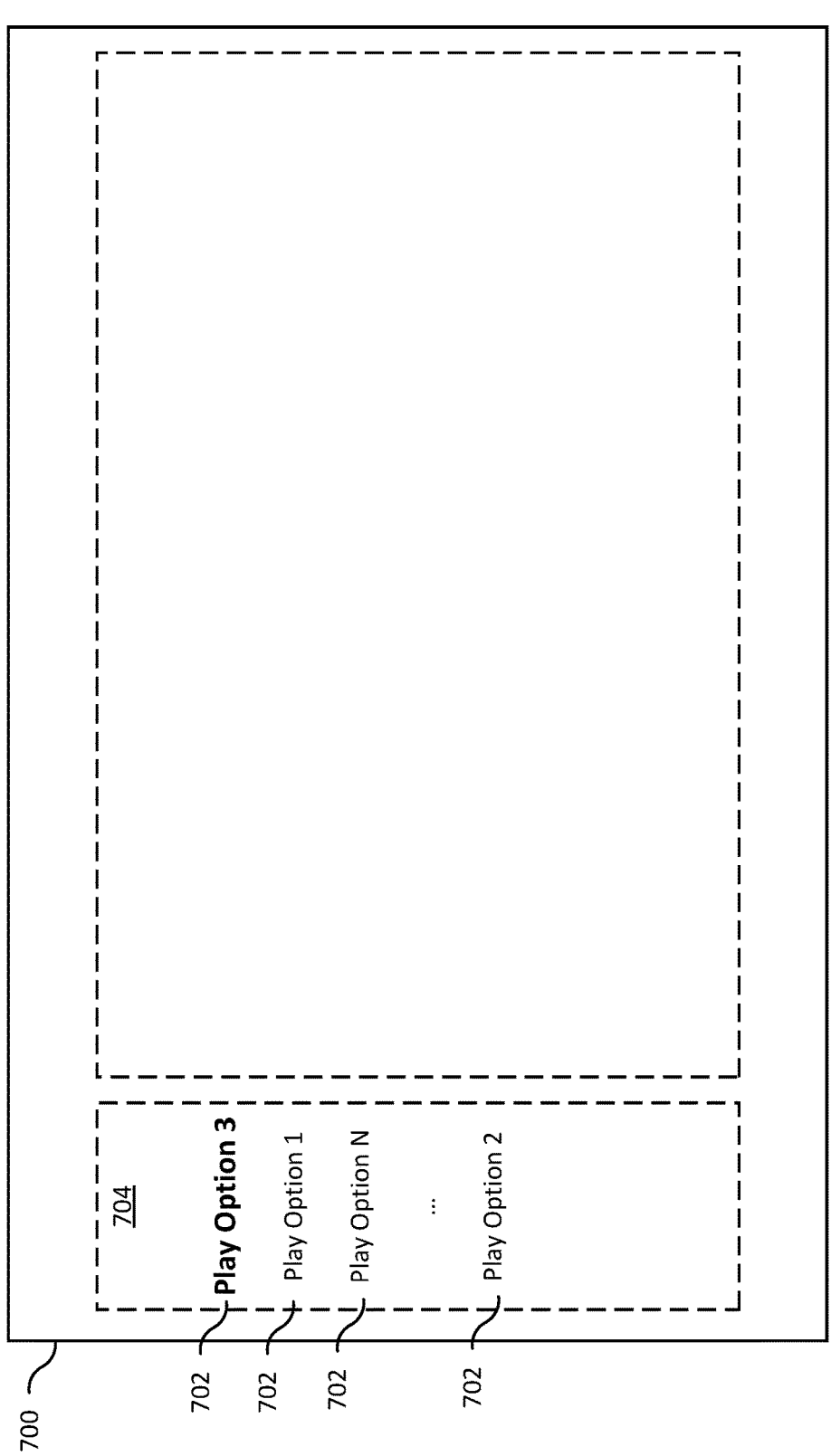
Figure 7B:
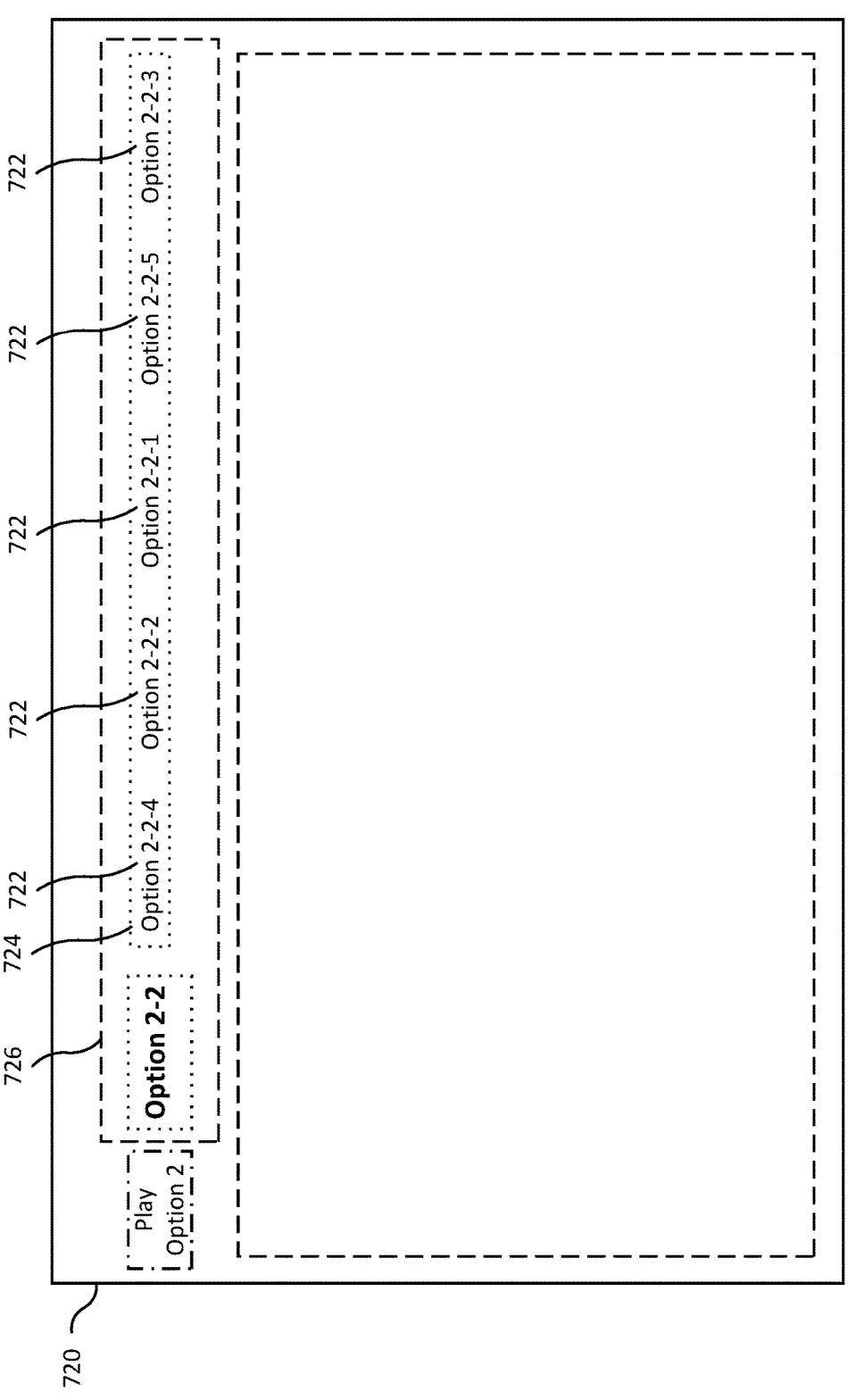
Figure 7C:
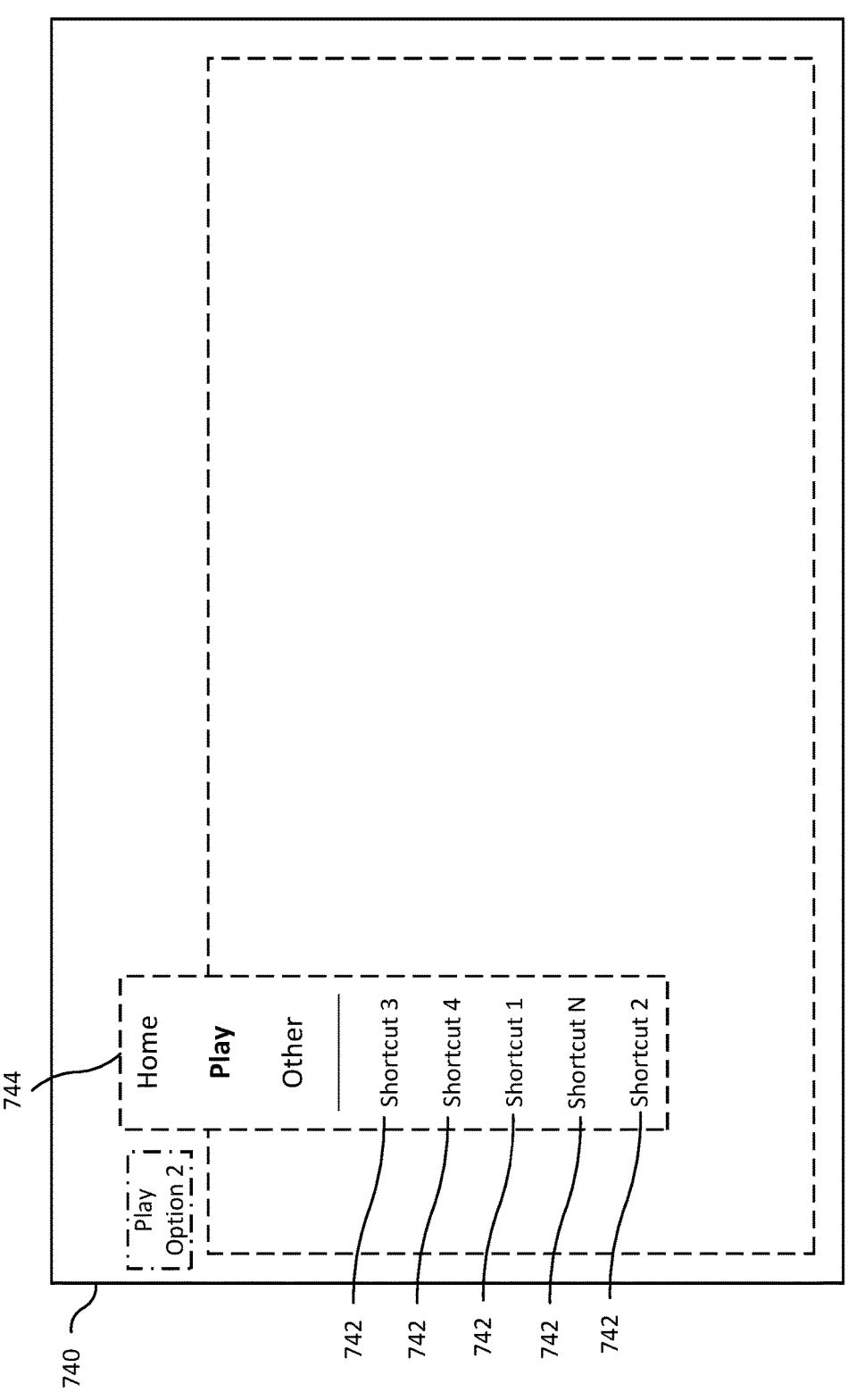

FIG. 7A-7C are example updated user interfaces corresponding to the user interface of FIG. 2, FIG. 4, and FIG. 6, respectively, according to an example implementation of the present disclosure.

Figure 8:
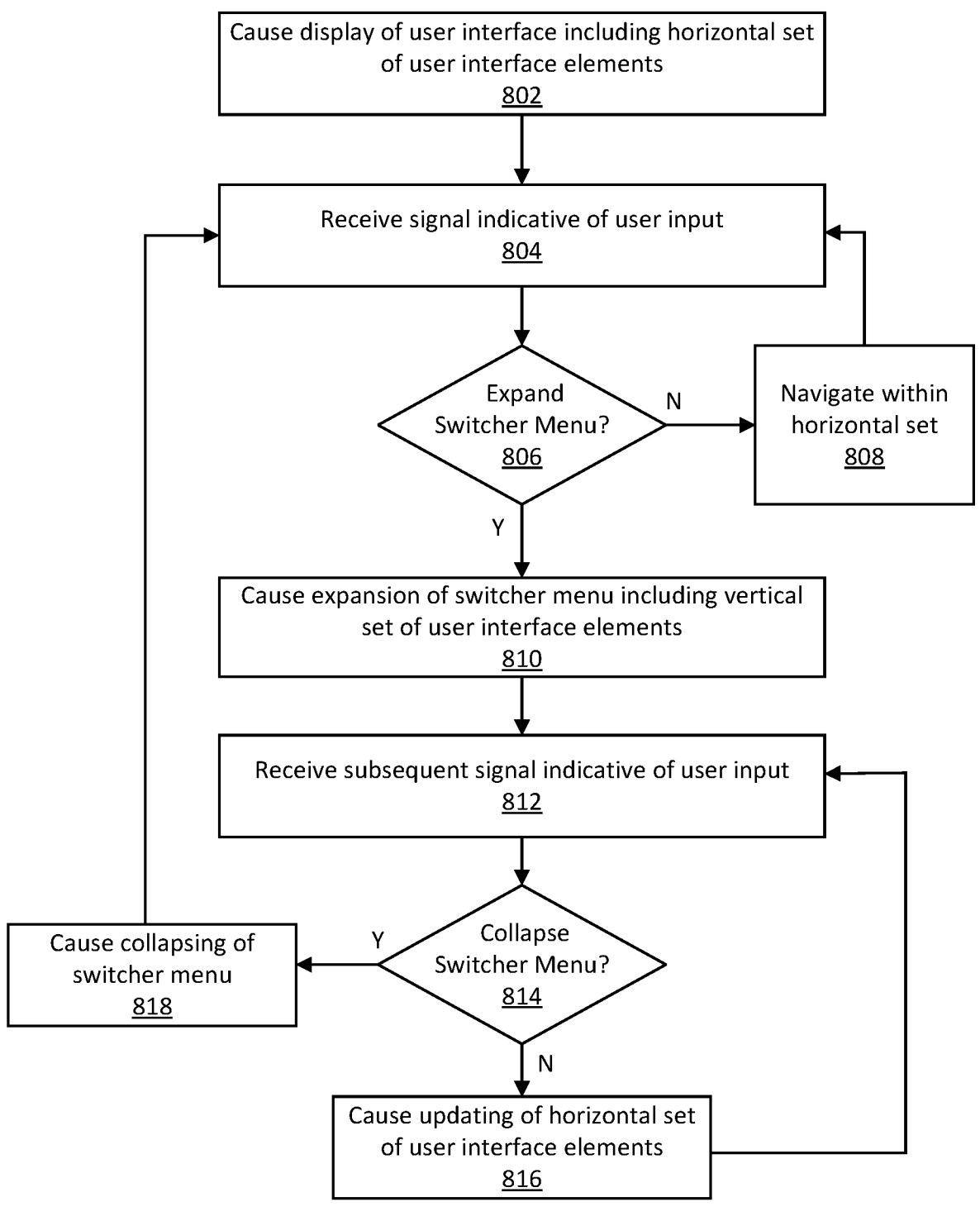

FIG. 8 is a flowchart showing an example method of providing a navigational system for video game play configuration, according to an example implementation of the present disclosure.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Overview

Many video game applications (also referred to as "video games") facilitate different operational modes. For example, a given sporting video game may have a tournament mode, a team mode, an online mode, a manager/coach or player career mode, a quick-play mode, and so forth. As another example, a given first-person-shooter (FPS) video game may have a campaign or story mode, a co-operation mode, an online mode, and so forth. Each operational mode may have various menu items (and sub-menu items) for configuration thereof. For example, within the team mode of a sporting video game, the team mode may include a home menu, play menu, club/team menu, objectives menu, trade market menu, store menu, and so forth, each corresponding menu having various sub-menus.

Navigating between the operational modes, and corresponding menu items, can be challenging and unintuitive. For example, content and corresponding information may be buried within many menus and screens, which results in players drilling-down and back-and-forth to simply learn how to navigate the video game menu items. Additionally, some menu items or modes may have unfamiliar terms or names/naming conventions which may obscure their distinctions, while contributing to increased disorientation and confusion during gameplay. Further contributing to this effect, some information (such as multiplayer details, player mechanics, timing, etc.) may be provided in small text and lack saliency, resulting in excess information being provided to the player which can be challenging to understand quickly and consistently. In this regard, the resultant user experience is reduced, through a significant "learning curve" of the menu items and modes, and also reduces a likelihood of experimentation with new game play modes.

In sum, navigating complex video game applications is complicated, with varied interactions/keystrokes/selections, resulting in flawed interaction paradigms. With expanded gameplay modes (in some instances, 40 or more gameplay modes-particularly when considering the many layers of customization or configuration available for a given operational mode, and where a video game application has multiple operational modes which support different layers of customization and configuration), some architectures do not support exposure, education, smart filtering, or curated suggestions, which in turn results in "menu-wandering" within a navigation footprint, with excessive crowding of elements with no visual hierarchy. Additionally, and resultant from such drawbacks, such architectures are not scalable as new game modes and configurations are deployed.

Such paradigms may also result in various technical challenges. For example, by providing navigation architectures which have drill-down and roll-up hierarchies, which are navigated between through button clicks, such navigation architectures may be prone to lag resultant from propagation and signaling delays. Additionally, such navigation architectures may be prone to double-clicks or miss-clicks, which can result in unnecessarily navigating to different pages, unintended clicks, and so forth. Further, such navigation architectures may inefficiently utilize screen/display resources, by expanding sub-menus within menus, thereby unnecessarily overlaying/concealing major portions of a display region of a display.

Referring generally to the FIGURES, the systems and methods described herein may provide user interfaces having various states with corresponding hierarchies (or levels/tiers) of information, for configuration of game play of a video game application. According to the systems and methods described herein, a player may navigate a user interface having different states, where the user interface in a corresponding state triggers provision of limited information. Additionally, the player may navigate the user interface via a navigation portion or region of the user interface, which includes axially arranged user interface elements (or actionable items) which are, e.g., arranged horizontally or vertically. For example, user interface elements corresponding to menu/sub-menu/etc. options may be arranged along a horizontal axis of the navigation region of the user interface, indicative of selectable items within the current state. Additionally, user interface elements corresponding to other states may be arranged along a vertical axis, indicative of selectable items within a previous or subsequent state. In various embodiments, the navigation region may include a switcher menu interface element, which can be selected via a hotkey, and displays vertically-orientated user interface elements to quickly and intuitively navigate between different states of the user interface.

The systems and methods described herein may provide various technical benefits over other menu navigation paradigms and architectures. For example, by providing different information via the user interface based on the state of the user interface, the systems and methods described herein may provide a limited subset of information corresponding to the current state. Additionally, by providing a switcher menu, the systems and methods provided herein may provide an intuitive navigation mechanism to quickly switch between different states of the user interface and reduce the number of interactions between player and server or host. Such implementations may also reduce a click count or total number of user interactions needed to arrive at an intended target page, which reduces latency and lag in game play experience (e.g., which typically results from multiple clicks, double-clicks, missed or unregistered clicks, etc.). Additionally, by dynamically ordering user interface elements within the user interfaces described herein, the systems and methods may reduce a click path (e.g., a total number of clicks/user interactions) needed to arrive at the intended user interface element. Additionally, by providing an automatically expandable/collapsible switcher menu, the systems and methods described herein can selectively increase and decrease an underlying content display area or region, to provide better allocated resource/space optimization within a display region of a display.

Overview of User Interface Navigation System and Operating Environment

Figure 1:
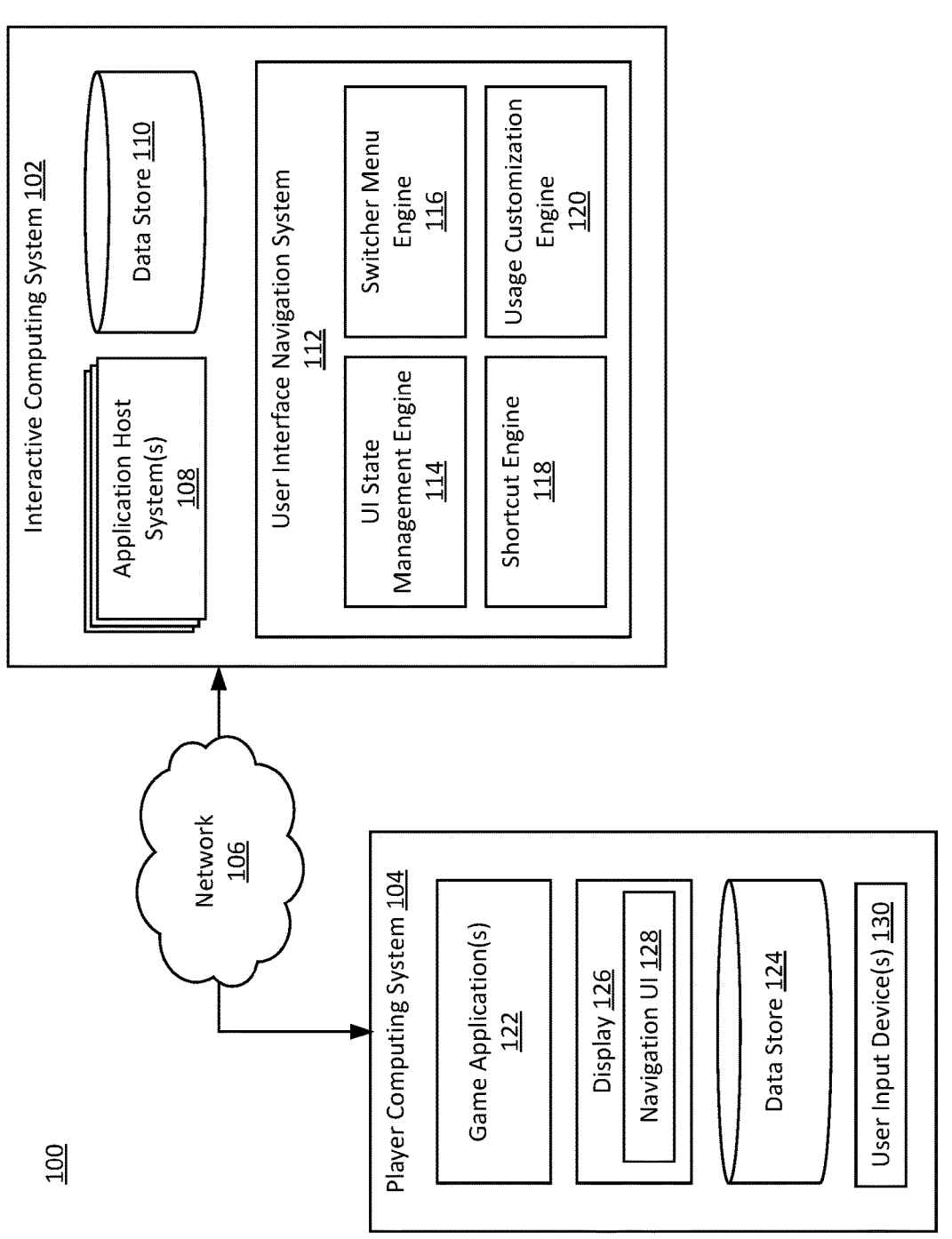

FIG. 1 is diagram of a networked computing environment 100 for implementing one or more embodiments of a navigational system for video game play configuration, according to an example implementation of the present disclosure. The network computing environment 100 is shown to include an interactive computing system 102 communicably coupled to a player computing system 104 via a network 106. While FIG. 1 illustrates one interactive computing system 102 and one player computing system 104, it is noted that the networked computing environment 100 may include multiple instances of the interactive computing system 102 and/or multiple player computing systems 104. The interactive computing system 102 may be or include a computing system or environment which hosts, provisions, provides, manages, or otherwise supports one or more applications. The interactive computing system 102 may include one or more application host systems 108, a data store 110, and a user interface navigation system 112 including a plurality of engines 114-120 for providing a navigation user interface 128 for navigating between various menu items of an application supported by the application host system(s) 108.

The player computing system 104 may include, execute, run, or otherwise provide one or more game applications 122. The player computing system 104 may be configured to communicate (e.g., via the network 106) with the application host system(s) 108 to download/upload or otherwise exchange information relating to the game application(s) 122 provided by the player computing system 104. Such information may be stored or otherwise maintained by a data store 124 of the player computing system 104, uploaded for storage at the data store 110 at the interactive computing system 102, etc. The player computing system 104 may include or be communicably coupled with a display 126 configured to render, display, or otherwise provide the navigation user interface (UI) 128. The display 126 may be or include any type or form of display, including a light emitting diode (LED) display, an organic-LED (OLED) display, liquid crystal display (LCD), plasma display, or any other type or form of display, which may be integrated into the player computing system 104 or a standalone display (such as a monitor or television) communicably coupled to the player computing system 104. The player computing system 104 may include one or more user input device(s) 130 for receiving user interactions for navigating/selecting/ interacting with the navigation UI 128. The user input device(s) 130 may include, for example, a handheld controller, touchpad, a keyboard, a mouse, a joystick, stylus, gesture recognition sensor, or any other type/form of input device.

The network 106 may be or include any type or form of wired or wireless communication network to facilitate communication between two or more endpoints. For example, the network 106 may include a cellular or internet-based network. Additionally, the player computing system 104 and/or interactive computing system 102 may use a corresponding local network. For example, the player computing system 104 may be communicably coupled to a local area network (such as a wireless local area network, e.g., WI-FI). In this example, communications sent from the player computing system 104 (and conversely, received by the player computing system 104) may be routed via the local area network.

A. Interactive Computing System

The interactive computing system 102 may include application host systems 108, a data store 110, and a user interface navigation system 112. These systems may cooperate or otherwise communicate with one another, as part of providing various portions of the navigation UI 128 described herein. For example, the user interface navigation system 112 may obtain data associated with the game application 122 from the application host system(s) 108, and retrieve data corresponding to operational modes, menu items, sub-menu items, etc. from the data store 110. Additionally, the user interface navigation system 112 may receive selections of user inputs (e.g., from the user input device 130) for configuring information associated with the game application 122, and store such information in association with a user profile (e.g., corresponding to the user/ player of the player computing system 104) in the data store 110. In some embodiments, the application host system(s) 108 may communicate with the data store 110 to execute/ provision/host the game application 122. In some embodiments, the interactive computing system 102 may be associated with a network-based service, which may be operated or managed by a game publisher, game developer, platform provider, or other host entity.

1. Application Host Systems

The application host system(s) 108 can be configured to execute a portion of the game application 122 operating on the player computing system 104, a host application or resource, or any other application or service of the interactive computing system 102. In various embodiments, the interactive computing system 102 may be configured to facilitate multiple players or player computing systems 104 accessing a portion (or instance) of the game application 122. In some embodiments, the portion of the game application 122 executed by application host system(s) 108 may create a persistent virtual environment. The persistent virtual environment may facilitate interaction amongst players in a synchronous and/or asynchronous manner. In some cases, multiple instances of the persistent virtual environment may be established, hosted, or otherwise managed by the interactive computing system 102 (e.g., through execution by the application host system(s) 108). For example, the application host system(s) 108 and/or interactive computing system 102 may be configured to assign a set of players (or player computing systems 104) to one instance of the persistent virtual environment for access, while assigning another set of players (or player computing systems 104) to another instance of the persistent virtual environment for access.

In some embodiments, the application host system(s) 108 may execute a hosting system for executing various aspects of a game environment. For example, in one embodiment, the game application 122 may be a competitive game, such as a sports game or a first person shooter game, and the application host system 108 can provide a dedicated hosting service for hosting multiplayer game instances. As another example, the application host system 108 may be configured to facilitate the creation of game instances hosted by player computing devices 104. In some embodiments, the application host system(s) 108 can provide a lobby or other environment for players to virtually interact with one another.

2. Data Store of Interactive Computing System

The interactive computing system 102 can include a data store 110. The data store 110 can be configured to store data acquired by other systems, such as, for example, telemetry data, video data, game or user interface state information, user data, or the like. In some embodiments, the data store 110 may store user profile data associated with a video game publisher, a game platform provider or other service. In such an example, the user profile data may be deployed, provisioned, or otherwise provided by the interactive computing system 102 to the player computing system 104 (e.g., at log-in), which facilitates user maintained preferences, progress, customization information, and/or other data across a plurality of different video games and player computing systems 104. The data store 110 may be distributed across multiple computing systems (such as multiple interactive computing systems 102). In some embodiments, the data store 110 may be network-based storage system where data may be stored in different locations.

3. User Interface Navigation System

The user interface navigation system 112 may be configured to provide information, data, and the like for generating, rendering, or otherwise displaying the navigation UI 128. In some embodiments, the navigation UI 128 may be a graphical user interface which includes or incorporates a navigation region or portion, for navigating between operational modes of a game, menu items corresponding to respective operational modes, sub-menu items corresponding to a respective menu item, and the like (generally referred to as "game play configuration options"). The navigation UI 128 may provide an intuitive navigation paradigm for navigating between such game play configuration options, through nested/tiered/hierarchical information displayed within the navigation UI 128.

The user interface navigation system 112 may include one or more engines 114-120. The engines 114-120 may be or include any device, component, element, or hardware designed or configured to execute or otherwise perform various functions relating to the user interface navigation system 112 described herein. For example, the user interface navigation system 112 may include a UI state management engine 114, a switcher menu engine 116, a shortcut engine 118, and a usage customization engine 120. While these engines 114-120 are shown and described herein, it is noted that fewer and/or alternative engines may be incorporated into the user interface navigation system 112. For example, one or more of the engines 114-120 may be divided into multiple engines. Additionally or alternatively, two or more of the engines 114-120 may be combined into a single engine.

a. UI State Management Engine

The user interface navigation system 112 may include a UI state management engine 114. The UI state management engine 114 may configured to determine, identify, or otherwise manage a state of the navigation UI 128 as it is navigated by the player. The navigation UI 128 may include a plurality of states, each state corresponding to a hierarchy of information which is to be displayed in the navigation region on the navigation UI 128. The operational modes, and hierarchy of information (e.g., menu items/sub-menu items) may be retrievably stored as video game data in the data store 110 and accessible by the UI state management engine 114 for populating or otherwise generating the navigation UI 128. The UI state management engine 114 may be configured to determine the state of the navigation UI 128 based on signal(s) received from the player computing system 104, retrieve the corresponding hierarchy of information from the data store 110, and generate the navigation UI 128 for rendering at the player computing system 104 based on the determined state. For example, following launch of the game application 122 (or user log-in), the player computing system 104 may be configured to communicate, transmit, send, or otherwise provide a signal (e.g., via network 106) to the interactive computing system 102 indicative the game application 122 being launched. In response to receiving the signal, the UI state management engine 114 may be configured to set the navigation UI 128 to an initial state. The UI state management engine 114 may be configured to retrieve a first or initial hierarchy of information from the data store, based on each data item from the data store associated with the first hierarchy being linked or associated with the initial state. In this regard, in the initial state, the navigation UI 128 may display an initial hierarchy of information for selecting an operational mode of the game corresponding to the game application 122. Such information may be received by the player computing system 104 from the UI state management engine 114, retrieved from the data store 110 or local data store 124, etc.

Once the player selects the operational mode (e.g., by providing a corresponding user input via the user input device(s) 130), the UI state management engine 114 may update the state of the navigation UI 128 from the initial state to a second state (e.g., based on a corresponding signal received from the provider computing system 104). In the second state, the navigation UI 128 may be configured to display a second hierarchy of information. Similar to the initial hierarchy of information, the second hierarchy of information may be received by the player computing system 104 from the UI state management engine 114, retrieved from the data store 110 or local data store 124, etc. As the player provides various inputs (via the user input device 130) to navigate between various interface elements displayed on the navigation UI 128, the UI state management engine 114 may be configured to update the state of the navigation UI 128 and thereby cause corresponding information displayed on the navigation UI 128 to be updated. Additional details regarding the navigation UI 128, including particular levels or hierarchies of information displayed on the navigation UI 128 and their corresponding states, are described in greater detail below with reference to FIG. 2-FIG. 7C.

b. Switcher Menu Engine

The user interface navigation system 112 may include a switcher menu engine 116. The switcher menu engine 116 may be configured to generate, produce, manage, or otherwise provide a switcher menu (or quick switcher, switcher, navigator, etc.) within the navigation UI 128. The switcher menu may be or include a list of actionable items (or user interface elements) which are used to navigate between different hierarchies of information. For example, and in some embodiments, the switcher menu may include content items corresponding to a previous hierarchy, to navigate "up" from the current hierarchy of information displayed on the navigation UI 128. Such content items may be selectable, to cause the UI state management engine 114 to update the state of the navigation UI 128 and correspondingly cause display of the hierarchy of information related to the current state of the navigation UI 128.

The switcher menu may be collapsible and expandable within the navigation UI 128. For example, the navigation UI 128 may include underlying content which is overlayed by the navigation region of the navigation UI 128. The switcher menu may be configured to expand within the navigation UI 128 (e.g., responsive to a user selection or trigger), to overlay the underlying content of the navigation UI 128. Similarly, the switcher menu may be configured to collapse within the navigation UI 128 (e.g., responsive to a user selection or trigger), to reveal the underlying content which was previously overlayed by the switcher menu.

In some embodiments, the switcher menu engine 116 may be configured to launch, deploy, or otherwise expand the switcher menu responsive to a user selection within any state of the navigation UI 128. For example, the switcher menu engine 116 may be configured to receive a signal from the player computing system 104 indicative of a selection of a predetermined button/switch/tap/user interaction (e.g., generally referred to as a "hotkey") with the user input device 130. In response to receiving the signal, the switcher menu engine 116 may be configured to expand the switcher menu within the navigation UI 128. The switcher menu engine 116 may be configured to populate, generate, or otherwise configure the switcher menu with one or more user interface elements identified or determined based on the current state of the navigation UI 128. For example, where the current state (e.g., as determined by the UI management engine 114) is a third state of the navigation UI 128, where the third state corresponding to sub-menu items (e.g., a third hierarchy of information) of a menu item (e.g., a second or other hierarchy of information) corresponding to the selected operational mode for the video game, the switcher menu engine 116 may be configured to populate the switcher menu with user interface elements corresponding to one or more menu items (e.g., from the second or other hierarchy of information).

Through the switcher menu, a player can non-linearly navigate between different hierarchies of information. For example, as opposed to navigating from child node/hierarchy, to parent node/hierarchy, then to grandparent node/hierarchy, through the switcher menu, the player can navigate (e.g., while currently on the child node hierarchy), to the grandparent node/hierarchy. Additionally, by providing persistent, dynamic, and/or shortcut interface elements on the switcher menu as described herein, the player can quickly navigate between any level/tier/hierarchy of information through selection of a corresponding user interface element of the switcher menu. For example, the switcher menu may be configured to facilitate a player to navigate within a particular game or operational mode of the game application 122, regardless of whether the player has currently navigated to a first hierarchy of information (e.g., a home screen of a particular operational mode), or, e.g., a fifth hierarchy of information (e.g., a specific configuration screen for configuring particular settings of a particular game mode). Additionally, because navigating between different user interface elements of the switcher menu causes updating/revealing of related (e.g., child) information related to the user interface element of the switcher menu, the player can orient themselves within the different operational modes quickly and intuitively.

In some embodiments, the switcher menu engine 116 may be configured to close, condense, or otherwise collapse the switcher menu responsive to a user input outside of the switcher menu. For example, the switcher menu engine 116 may be configured to receive a signal from the player computing system 104 indicative of a selection of a user input (e.g., via the user device 130) to navigate outside of the switcher menu. Such navigation may be within the user interface elements corresponding to the hierarchy of information currently displayed on the navigation UI 128 (e.g., outside of the switcher menu). In response to receiving the signal, the switcher menu engine 116 may be configured to collapse the switcher menu within the navigation UI 128.

Additional details regarding the switcher menu provided by the switcher menu engine 116, including particular user interface elements displayed therein, are described in greater detail below with reference to FIG. 5A-FIG. 6 and FIG. 7C.

c. Shortcut Engine

The user interface navigation system 112 may include a shortcut engine 118. The shortcut engine 118 may be configured to generate, maintain, update, configure, or otherwise provide one or more shortcuts for automatically updating the navigation UI 128 to a particular state. In some embodiments, the shortcuts may be user-defined shortcuts, learned shortcuts (e.g., based on common user traffic patterns for a particular user or group of users), predetermined shortcuts (e.g., based on game developer/designer pre-configurations). For example, the shortcut engine 118 may be configured to provide a shortcut to automatically update the navigation UI 128 to a particular state corresponding to a sub-menu of a menu corresponding to a particular operational mode, a shortcut to automatically update the navigation UI 128 to a particular state corresponding to a menu corresponding to a particular operational mode, and so forth. In this regard, responsive to selection of a respective shortcut, the UI state management engine 114 may be configured to automatically update the state of the navigation UI 128 to the state corresponding to the selected shortcut, which in turn causes display of content items associated with the corresponding state on the navigation UI 128.

In some embodiments, the shortcuts provided by the shortcut engine 118 may be incorporated or included in the switcher menu (e.g., provided by the switcher menu engine 116). For example, responsive to the switcher menu engine 116 causing deployment/launching of the switcher menu, the switcher menu engine 116 may be configured to incorporate content items corresponding to the shortcuts into the switcher menu (e.g., in addition to other content items identified or determined based on the current state of the navigation UI 128).

Additional details regarding the shortcuts managed by the shortcut engine 118 are described in greater detail below with reference to FIG. 5C-FIG. 6 and FIG. 7C.

d. Usage Customization Engine

The user interface navigation system 112 may include a usage customization engine 120. The usage customization engine 120 may be configured to determine, establish, configure, or otherwise order user interface elements displayed on the navigation UI 128 according to usage of the corresponding user interface elements. The usage customization engine 120 may be configured to maintain or otherwise access a count of user interactions with user interface elements, a duration of gameplay in operational modes, and so forth (e.g., from the player computing system 104). The usage customization engine 120 may be configured to update an order (e.g., from a default order) in which user interface elements are displayed on the navigation UI 128 based on or according to such information. For example, as certain user interface elements within a particular hierarchy of information for a corresponding state are interacted with more frequently (e.g., as reflected in the count of user interactions), those user interface elements may be ordered higher than user interface elements used less frequently.

The usage customization engine 120 may be configured to arrange the user interface elements along a click (or user interaction) path based on their corresponding order. In this regard, the usage customization engine 120 may be configured to reduce the user interaction path to more frequently used user interface elements, relative to less frequently used user interface elements. The usage customization engine 120 may be configured to store the order/ranking of user interface elements in the data store 110 (e.g., in association with the user profile) and/or cause storage of the order/ranking of user interface elements in the data store 124 of the player computing system 104.

Additional details regarding the order/arrangement of user interface elements by the usage customization engine 120 is described in greater detail below with reference to FIG. 7A-FIG. 7C.

B. Player Computing System

The player computing system 104 may be configured to be controlled by/interacted with a user, such as a player of a video game. The player computing system 104 may include hardware and software components for establishing communications over the network 106. For example, the player computing system 104 may be equipped with networking equipment and network software applications (for example, a web browser) that facilitates communications via one or more networks 106 (for example, the Internet or an intranet). The player computing system 104 may have varied local computing resources such as central processing units and architectures, memory, mass storage, graphics processing units, communication network availability and bandwidth, and so forth. The player computing system 104 may include any type of computing system. For example, the player computing system 104 may include any type of computing device(s), such as desktops, laptops, game application platforms, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few.

1. Game Application(s) and Application Host System

The player computing system 104 may be configured to execute one or more game applications 122. Such game applications 122 may be stored and/or executed locally and/or in a distributed environment. In a locally executed game application 122, generally, the game does not rely or utilize an external computing system (for example, the interactive computing system 102) to execute the game application. In some instances, a locally executable game can communicate with an external server (such as a server of the interactive computing system 102) to retrieve information associated with the game, such as game patches, game authentication, clouds saves, user account data, user customization information, or other features. In distributed game applications, the player computing system 104 may execute a portion of a game and the interactive computing system 102 (or an application host system 108 of the interactive computing system 102) may execute another portion of the game. For instance, the game may include a client portion executed by the player computing system 104 and a server portion executed by one or more application host systems 108. For the present discussion, the type of game application 104 can be a locally executable game, a distributed application, or an application that includes a portion that executes on the player computing system 104 and a portion that executes on at least one of the application host systems 108. It should be understood that, in instances in which the game application 104 is a locally executable game, the user interface navigation system 112 described above (and features/elements/hardware corresponding thereto) may be executed locally.

2. Player Data Store

The player computing system 104 can include a data store 124. The data store 124 can be configured to store data associated with one or more game applications 122, local account data associated with an account maintained for the player by the interactive computing system 102, and/or other game-related or account-related data. For example, the data store 124 may be configured to store data associated with user preferences, interaction counts with user interface elements of the navigation UI 128, operational mode gameplay duration for different operational modes of the game application 122, usage customization information related to the navigation UI 128, and so forth. Such information may be used by the player computing system 104 and/or interactive computing system 102 for providing and/or updating the navigation UI 128.

Example User Interface Implementations

Referring generally to FIG. 2-FIG. 7C, depicted are various example implementations of user interfaces corresponding to the navigation UI 128 described above. In various embodiments as described herein, the implementations or instances of user interfaces illustrated in FIG. 2-FIG. 7C may be displayed based on the corresponding state of the navigation UI 128, usage customization information, etc. For example, the UI state management engine 114 may determine the current state of the user interface, and populate the user interface with information (e.g., represented as user interface elements) identified/determined to correspond to the current state. Such information may be modified, augmented, or otherwise configured based on the usage customization information (e.g., from the usage customization engine 120), based on user interface elements identified by the switcher menu engine 116, and/or shortcuts provided by the shortcut engine 118.

Referring specifically to FIG. 2, depicted is an example of a user interface 200 showing a first hierarchy of information 202 displayed thereon, according to an example implementation of the present disclosure. In some embodiments, the user interface 200 may be displayed, provisioned, rendered, or otherwise provided (e.g., as an instance of the navigation UI 128 in a first state) responsive to launching the game application 122 on the player computing system 104. In other words, the user interface 200 may be or include a launch screen user interface. As stated above, the player computing system 104 may be configured to communicate a signal to the interactive computing system 102 indicative of launching the game application 122 on the player computing system 104. The UI state management engine 114 may be configured to receive the signal from the player computing system 104, and set the navigation UI 128 to an initial (or first) state. In the first state, the navigation UI 128 may include or incorporate features of the user interface 200 of FIG. 2.

As shown in FIG. 2, the user interface 200 may include a navigation region 204 and a graphical content region 206. The navigation region 204 may be arranged along a vertical axis of the user interface 200 (e.g., as shown in FIG. 2), along a horizontal axis of the user interface 200 (e.g., as shown in FIG. 3A), and/or a combination of both arranged along the vertical and horizontal axis (e.g., as shown in FIG. 5C). The navigation region 204 may at least partially surround the graphical content region 206. For example, the navigation region 204 may be arranged along a portion of a perimeter of the graphical content region 206. In various embodiments, the navigation region 204 may overlay the graphical content region 206. For example, the graphical content region 206 may encompass, include, or span substantially all of the user interface 200, with the navigation region 204 overlaying a portion of the graphical content region 206. The graphical content region 206 may include or present launch (or home) screen content of the user interface 200. In other instances of the graphical content region described herein, the user interface may include graphical content which his related to the particular operational mode, menu item, etc. in the graphical content region.

The user interface 200 may include a plurality of user interface elements 208 arranged within the navigation region 204. In implementations in which the navigation region 204 is arranged along a vertical axis as shown in FIG. 2, the user interface elements 208 may be arranged vertically along the vertical axis. In implementations in which the navigation region 204 is arranged along a horizontal axis, the user interface elements 208 may be arranged horizontally along the horizontal axis. The user interface elements 208 may include selectable indicia, actionable items, etc. For example, the user interface elements 208 may include object or textual fields. The user interface 200 may display a first level/tier/hierarchy of information in the user interface elements 208.

Each user interface element 208 may include or correspond to selectable information for a corresponding operational mode of the game application 122. For example, as shown in FIG. 2, the user interface elements 208 may identify corresponding play options (e.g., Play Option 1-N), where each play option corresponds to a respective operational mode of the game application 122. The play options may include, for example, in a sports game application 122, a career mode, a team mode, a quick play mode, etc. In a first person shooter game application 122, the play options may include a campaign mode, a multiplayer mode, a private match mode, etc. In various embodiments, at least some of the operational modes of the game application 122 may be represented by corresponding user interface elements 208. For example, each operational mode may have a corresponding user interface element 208 represented/depicted/displayed within the navigation region 204. As another example, a dynamic subset of operational modes may have corresponding user interface elements 208 displayed within the navigation region, where the dynamic subset updates as the player navigates between the user interface elements 208.

As a player toggles, switches, or navigates between the different user interface elements 208, the corresponding user interface element (e.g., to which the player is currently navigated) may be dynamically updated to emphasize, modify an appearance of, or otherwise indicate a current target user interface element 208. For example, as shown in FIG. 2, as the play navigates to the user interface element 208 corresponding to Play Option 2, the user interface 200 may dynamically update the text of the user interface element 208 (e.g., to be bolded, increased in size, highlighted, and so forth) relative to one or more other user interface elements 208. The emphasized user interface element 208 is also referred to herein as a "target user interface element 208", denoting the current user interface element which is targeted/hovered over/currently selectable within the set of displayed user interface elements 208.

In various embodiments, various other user interface elements 208 (e.g., other than the target user interface element 208) may be obfuscated, blurred, faded, omitted, etc. towards an extreme of the navigation region 204. For instance, the target user interface element 208 may be arranged at a center or central portion of the navigation region 208 (e.g., with corresponding emphasis of the target user interface element 208), and other user interface elements 208 may fade out towards an upper and lower portion of the navigation region. As one example, assuming user interface elements 208 corresponding to five play options are available for display on the user interface 200, if the target user interface element 208 corresponds to the third play option, the user interface elements 208 corresponding to the second and fourth play options may be displayed within the navigation region 204 in a manner similar to user interface elements corresponding to Play Option 1 and Play Option 3 shown in FIG. 2. Continuing this example, the user interface elements 208 corresponding to the first and fifth play options may be faded towards respective extremes of the navigation region. Where the player navigates to, e.g., the second play option (e.g., such that the target user interface element 208 now corresponds to the second play option), the user interface elements 208 corresponding to first and third play options may be displayed within the navigation region 204 in a manner similar to user interface elements corresponding to Play Option 1 and Play Option 3 shown in FIG. 2, with the user interface element 208 corresponding to the fourth play option fading towards a corresponding extreme of the navigation region 204 and the user interface element corresponding to the fifth play option being omitted from the navigation region 204. For instance, the user interface element corresponding to the fifth play option may be replaced with a truncation element (described below with reference to FIG. 3B-FIG. 3E and FIG. 4), indicating truncation of one or more user interface elements corresponding to additional play options.

The player may navigate through/between the user interface elements 208, and select one of the user interface elements 208 (e.g., via a corresponding selection of a key, button, or other user input to the user input device 130). In response to such a selection, the player computing system 104 may be configured to transmit, send, or otherwise provide a signal corresponding to the selection to the interactive computing system 102. The UI state management engine 114 may be configured to update the state of the navigation UI 128 according to the selection, to cause the navigation UI 128 to display an updated user interface with information corresponding to the selection.

Referring to FIG. 3A, depicted is an example of a user interface 300 showing, depicting, or otherwise providing a second tier/level/hierarchy of information 302, according to an example implementation of the present disclosure. In various embodiments, an instance of the user interface 300 may be displayed on or as the navigation UI 128, responsive to selection of a user interface element 208 of FIG. 2. In other words, the updated state of the navigation UI 128 (e.g., according to the selection of a user interface element 208) may cause the navigation UI 128 to display the user interface 300.

The user interface 300 may include elements and/or regions similar to the user interface 200. For example, the user interface 300 may include a navigation region 304 and a graphical content region 306 (e.g., similar to the navigation region 204 and graphical content region 206 of FIG. 2). In the embodiment shown in FIG. 3, the navigation region 304 may be arranged along a horizontal axis of the user interface 300. The user interface 300 may include an indication 308 of the selected play mode. The indication 308 may be or include a defined or predetermined logo corresponding to the selected play mode, an abbreviation of the selected play mode, or any other identifier corresponding to the selected play mode.

The navigation region 304 may include a plurality of user interface elements 310 arranged within a field 312 of the navigation region 304. Such user interface elements 310 may be similar to the user interface elements 208, except that such user interface elements 310 may correspond to the second hierarchy of information. For example, in response to the updated state of the navigation UI 128, the UI state management engine 114 may be configured to automatically update the user interface elements 310 provided on the navigation UI 128 to correspond to the particular state of the navigation UI 128. In this regard, the user interface elements 310 may include options (or menu items) which correspond to the selected play mode. For instance, assuming that the play mode is a team mode, the user interface elements 310 may include menu items for the team mode, such as (but not limited to) a home menu item, a news menu item, an objectives menu item, a play menu item, a club menu item, a store menu item, a settings menu item, etc. In this regard, each play mode selectable on the first user interface 200 via a corresponding user interface element 208, may include a corresponding second hierarchy of information which is displayed as user interface elements 310 within the navigation region 304 of the second user interface 300.

The user interface 300 may include a switcher menu user interface element 314. The switcher menu user interface element 314 may be or include an element which, when selected, causes launching of the switcher menu described herein. The switcher menu user interface element 314 may be displayed within a switcher menu field 316 of the navigation region 304. In some embodiments, the switcher menu user interface element 314 (e.g., for the user interface 300 corresponding to the second hierarchy of information) may display information relating to a category of the second hierarchy of information. For example, the switcher menu user interface element 314 may display "HOME", where each of the user interface elements 310 corresponding to the second hierarchy of information are selectable menu items within a home menu for the operational mode of the game application 122 (e.g., menu items for news, objectives, play, club, settings, etc.).

When the switcher menu is launched (e.g., in response to a corresponding user interaction with the user input device 130), the switcher menu field 316 (and correspondingly the navigation region 304) may be expanded to overlay the graphical content region 306. Similarly, when the switcher menu is collapsed (e.g., in response to a corresponding user interaction with the user input device 130) may collapse to expose or otherwise reveal the previously-overlaid portions of the graphical content region 306. As described in greater detail below, the switcher menu may display or otherwise provide various additional user interface elements for navigating between the various hierarchies of information.

Referring to FIG. 3B-3E, with continued reference to FIG. 3A, depicted are simplified diagrams illustrating navigating between the user interface elements 310 corresponding to the second hierarchy of information displayed on the user interface 300, according to an example implementation of the present disclosure. As shown in the progression between FIG. 3B-FIG. 3E, a player may navigate between various user interface elements (e.g., left and right) by providing/selecting/inputting various user interactions on the user input device 130. For example, the player may navigate from the user interface element 310 corresponding to Option 2-1 to the user interface element 310 corresponding to Option 2-2 (e.g., from left to right), by providing user interactions to a joystick or directional keypad of the user input device 130, a right bumper of the user input device 130, or the like. Similar to the emphasis of user interface elements 310 described above with reference of FIG. 2, the user interface elements 310 may be dynamically updated to indicate the target user interface element 310 (e.g., user interface element 310 corresponding to Option 2-2 shown in FIG. 3A).

As shown in FIG. 3B-FIG. 3E, the navigation region 304 may include a truncation element 350. The truncation element 350 may indicate, denote, or otherwise identify one or more truncated user interface elements which are omitted/not included/not displayed within the navigation region 304 (e.g., within the field 312 of the navigation region 304). As the player navigates between the user interface elements 310 which are currently displayed in the navigation region 304, the user interface elements 310 displayed within the navigation region 304 may be correspondingly updated (along with a position of the truncation element 350). For example, as shown in the progression between FIG. 3B and FIG. 3C, as the player navigates from left to right, a first user interface element (e.g., interface element 310(1)) may be omitted from the navigation region 304, with a truncation element 350 provided in the corresponding location of the first user interface element. Similarly, as shown in the progression between FIG. 3D and FIG. 3E, as the player navigates from right to left, an N-th user interface element (e.g., interface element 310(N)) may be omitted from the navigation region

304, with a truncation element 350 provided in the corresponding location of the N-th user interface element.

It is noted that, while five user interface elements 310 are shown as being included in the navigation region 304, any number of user interface elements 310 may be displayed within the navigation region 304 (e.g., including user interface elements 310 corresponding to all selectable options, or any subset of user interface elements 310 corresponding to a subset of the selectable options and corresponding truncation elements 350).

The player may navigate through/between the user interface elements 310, and select one of the user interface elements 310 (e.g., via a corresponding selection of a key, button, or other user input to the user input device 130). In response to such a selection, the player computing system 104 may be configured to transmit, send, or otherwise provide a signal corresponding to the selection to the interactive computing system 102. The UI state management engine 114 may be configured to update the state of the navigation UI 128 according to the selection, to cause the navigation UI 128 to display an updated user interface with information corresponding to the selection.

Referring to FIG. 4, depicted is an example of a user interface 400 showing a third hierarchy of information 402, according to an example implementation of the present disclosure. In various embodiments, an instance of the user interface 400 may be displayed on the navigation UI 128, responsive to selection of a user interface element 308 of FIG. 3. In other words, the updated state of the navigation UI 128 (e.g., according to the selection of a user interface element 308) may cause the navigation UI 128 to display the user interface 400.

The user interface 400 may include elements and/or regions similar to the user interface 200, 300. For example, the user interface 400 may include a navigation region 404 similar to the navigation region 304, a graphical content region 306 similar to the graphical content region 206, and an indication 408 of the selected play mode similar to the indication 308.

In the embodiment shown in FIG. 4, the navigation region 304 may include user interface elements 410, which may be arranged within a field 412 of the navigation region 404 in a manner similar to arrangement of the user interface elements 310 within the field 312. Such user interface elements 410 may be similar to the user interface elements 310, except that the user interface elements 410 may correspond to the third hierarchy of information. For example, in response to the updated state of the navigation UI 128, the UI state management engine 114 may be configured to automatically update the user interface elements 410 provided on the navigation UI 128 to correspond to the particular state of the navigation UI 128. In this regard, the user interface elements 310 may include sub-options (or sub-menu items) which correspond to the selected menu item corresponding to the selected user interface element 310. For instance, assuming that the play mode is a team mode and the menu item corresponding to the selected user interface element 310 is the play menu item, the user interface elements 410 may include or correspond to sub-menu items for the play menu item, such as (but not limited to) a cooperative lobby sub-menu item, a moments sub-menu item, a division rivals sub-menu item, a champions sub-menu item, a single player draft sub-menu item, etc. In this regard, each menu item selectable on the first user interface 300 via a corresponding user interface element 310, may include a corresponding third hierarchy of information which is displayed as user interface elements 410 within the navigation region 404 of the second user interface 400.

Similar to user interface 300, the user interface 400 may include a switcher menu user interface element 414. The switcher menu user interface element 414 may be displayed within a switcher menu field 416 of the navigation region 304. In some embodiments, the switcher menu user interface element 414 (e.g., for the user interface 400 corresponding to the third hierarchy of information) may display information relating to a category of the third hierarchy of information. For example, the switcher menu user interface element 414 may display information relating to the selected menu item from the user interface 300. As one example, where a user selects a user interface element 310 from FIG. 3 corresponding to a play menu item, the switcher menu user interface element 414 may display "PLAY", where each of the user interface elements 410 corresponding to the third hierarchy of information are selectable sub-menu items within a play menu for the operational mode of the game application 122. The player may navigate between the user interface elements 410 in a manner similar to navigation of the user interface elements 310 described above, with corresponding truncation elements 450 added to the navigation region 404 as the player navigates the user interface elements 410.

It is noted that, while FIG. 2-FIG. 4 show user interfaces 200-400 including three hierarchies of information respectively displayed thereon, it is noted that additional user interfaces may be displayed to, e.g., further drill down into sub-sub menu items, which may include specific in-game configurations and elements for launching game play.

Referring to FIG. 5A-FIG. 5B, depicted are simplified diagrams showing a navigation scheme for navigating between a different hierarchies of information using a switcher menu 500, according to an example implementation of the present disclosure. As shown in FIG. 5A and FIG. 5B, the switcher menu 500 may be expanded (or launched, deployed, etc.) along a vertical axis of the user interface in an outward (e.g., upper and lower) direction relative to the switcher menu user interface element 502, and collapsed along the vertical axis in an inward direction relative to the switcher menu user interface element 502. In some embodiments, a player may select/provide a predetermined user interaction (e.g., a hotkey) on the user input device 130 to cause automatic expansion of the switcher menu 500.

As stated above, the switcher menu engine 116 may be configured to populate, incorporate, or otherwise include one or more sub-fields (represented as user interface elements 504) within the switcher menu 500 based on the state of the navigation UI 128. In some embodiments, the user interface elements 504 may include one or more user interface elements 504 from a previous hierarchy of information. For example, where the switcher menu 500 is launched from user interface 400 corresponding to the third hierarchy of information (e.g., including sub-menu items), the switcher menu engine 116 may configure the switcher menu 500 to include user interface elements 504 corresponding to the second hierarchy of information (e.g., menu items). As the player navigates between the user interface elements 504, the switcher menu engine 116 may configure the corresponding user interface elements 506 displayed within the field 508 to be updated (e.g., by replacing a first set of user interface elements 506 which correspond to a previous user interface element 504 from the switcher menu 500, with a second set of user interface elements 506 which correspond to the target user interface element 504 from the switcher menu 500).

As shown in FIG. 5B, the switcher menu 500 may collapse to the selected user interface element 504 from the switcher menu 500, in response to the player navigating from the switcher menu 500 to one of the user interface elements 506 displayed within the field 508. For example, where the player navigates from a first to a second user interface element 504 in the switcher menu 500 (which correspondingly causes updating of the user interface elements 506 displayed in the field 508), and the player subsequently navigates to a user interface element 506 within the field 508 (e.g., by providing corresponding user interactions to a joystick, directional keyboard, toggle buttons, and so forth on the user input device 130), the switcher menu 500 may be collapsed along the vertical axis (as illustrated by arrows towards the switcher menu user interface element 502).

Referring to FIG. 5C, depicted is an example of a user interface 550 including the switcher menu 500 in a launched (or expanded) state, according to an example implementation of the present disclosure. As illustrated in FIG. 5, the user interface 550 may display an N-th hierarchy of information 552. The user interface 550 may include features/ regions/portions similar to those shown in FIG. 4, including a navigation region 554, a graphical content region 556, and an indicator 558. As shown in FIG. 5C, in response to launching of the switcher menu 500, the navigation region 554 may expand (e.g., vertically along the vertical axis aligned with the switcher menu field 560) to overlay at least a portion of the graphical content region 556. Similarly, once the switcher menu 550 is collapsed, the navigation region 554 may correspondingly collapse along the vertical axis aligned with the switcher menu field 560 to expose the underlying portion of the graphical content region 556.

As shown in FIG. 5C, the switcher menu 500 may include a plurality of user interface elements 504. Such user interface elements 504 may be aligned and/or arranged along the vertical axis (e.g., within the switcher menu field 560 of the navigation region 560). The user interface elements 504 may include user interface elements corresponding to a different hierarchy of information (e.g., an upper or different hierarchy from the current hierarchy of information corresponding to interface elements 506 displayed in the field 508). In some embodiments, the user interface elements 504 may include or correspond to shortcuts (e.g., managed or otherwise provided by the shortcut engine 118). For example, a player may navigate to one of the user interface elements 504 corresponding to a respective shortcut which, when selected, automatically causes the navigation UI 128 to be updated to a particular state associated with the shortcut. Such a state may include or correspond to selection of a particular menu item of a gameplay mode, a particular sub-menu item, etc.

Referring to FIG. 6, depicted is an example of one implementation of a user interface 600 including a switcher menu 602. As shown in FIG. 6, the switcher menu 602 may include a plurality of user interface elements 604, similar to the user interface elements 504 of the switcher menu 500 described above. In various embodiments, at least some of the user interface elements 504 may be persistent within a particular operational mode. For example, user interface elements corresponding to a "PLAY" menu item and a "HOME" menu item may be persistent, regardless of the current state of the navigation UI 128 within the particular operational mode. In this regard, causing launching of the switcher menu 602 may automatically cause displaying of corresponding user interface elements 604, where at least some of the user interface elements 604 are persistent. Additionally, the switcher menu 602 may include dynamic user interface elements which are determined/identified/provided based on the current state of the navigation UI 128. For example, the switcher menu 602 may include additional user interface elements 604 which correspond to a previous or upper hierarchy relative to the current hierarchy of user interface elements displayed in the field 606. Additionally, the switcher menu 602 may include additional user interface elements 604 corresponding to shortcuts.

Referring to FIG. 7A-7C, depicted are example updated user interfaces 700, 720, 740 corresponding to the user interfaces of FIG. 2, FIG. 4, and FIG. 6, respectively, according to an example implementation of the present disclosure. As shown in FIG. 7A-7C, relative to the corresponding user interfaces of FIG. 2, FIG. 4, and FIG. 6, the usage customization engine 120 may be configured to dynamically adapt/augment/configure an order of the user interface elements displayed within the user interfaces 700, 720, 740, based on usage of the corresponding user interface elements.

For example, and referring specifically to FIG. 7A with reference to FIG. 2, the usage customization engine 120 may be configured to determine a duration in which a player plays certain play modes corresponding to the game applications 122, relative to other play modes. The usage customization engine 120 may be configured to cause user interface elements 702 to be arranged within the navigation region 704 in an order according to the duration. For example, at an initial launch (e.g., absent previous gameplay in any particular play mode being registered with or associated with the user profile corresponding to the player of the player computing system 104), the user interface elements 702 may be arranged within the navigation region 704 in an initial order. Such an order may be preconfigured, configured for new players, etc.

Following subsequent launches following previous gameplay in various play modes, the usage customization engine 120 may be configured to cause the user interface elements 702 to be arranged within the navigation region 704 based on relative durations of gameplay in the various play modes. For instance, in the example shown in FIG. 2, the user interface elements 702 may be arranged in an initial order (e.g., a first user interface element 702 corresponding to Play Option 1, a second user interface element 702 corresponding to Play Option 2, a third user interface element 702 corresponding to Play Option 3, and an n-th user interface element 702 corresponding to Play Option N). After the player records a duration of time in certain game play modes, the user interface elements 702 may be arranged in a dynamic order according to the duration of time in the play modes (e.g., with the third user interface element 702 corresponding to Play Option 3 displayed at a top of the navigation region 704, followed by the first, n-th, and second user interface elements). By dynamically arranging the user interface elements 702 within the navigation region 704, based on duration of time in the play modes, a user may provide fewer clicks/user interactions to navigate to preferred user interface elements 702 (e.g., thus shortening a "click path" to an intended or desired destination user interface element 702). For example, at launch of the user interface 700, the target user interface element 702 which is selectable may be the top-most user interface element 702. Thus, by dynamically arranging the user interface elements 702 to provide those which are most interacted with highest, fewer clicks or needed to arrive at the intended destination.

Referring to FIG. 7B and FIG. 7C, and similar to FIG. 7A, the usage customization engine 120 may be configured to modify and/or update an order of user interface elements displayed on the corresponding user interfaces 720, 740, according to usage of the respective user interface elements. For example, the usage customization engine 120 may be configured to determine a selection/click/interaction count for each of the user interface elements corresponding to a particular hierarchy of information, and update the order of user interface elements displayed on the user interface according to the click count.

As illustrated in FIG. 7B, the usage customization engine 120 may be configured to update, modify, or otherwise configure the order of user interface elements 722 arranged in the field 724 of the navigation region 726, based on or according to the count of interactions with the respective user interface elements 722. For example, the usage customization engine 120 may be configured to arrange the user interface elements 722, from left to right, according to the respective count of interactions with the user interface elements 722. In the example shown in FIG. 7B, user interface element 722 corresponding to Option 2-2-4 may be arranged first in the field 724, based on the count of interactions with the user interface element 722 corresponding to Option 2-2-4 being greater than the count of interactions with other user interface elements 722. By dynamically arranging the order of user interface elements 722 within the field 724, based on relative counts of user interactions with the respective user interface element 722, a user may provide fewer clicks/user interactions to navigate to preferred user interface elements 722 (e.g., thus shortening a "click path" to an intended or desired destination user interface element 722).

As illustrated in FIG. 7C, the usage customization engine 120 may be configured to update, modify, or otherwise configure the order of user interface elements 742 arranged in the switcher menu field 744, based on or according to the count of interactions with the respective user interface elements 742. The usage customization engine 120 may be configured to arrange or order shortcut user interface elements 742 and/or dynamic user interface elements 742 according to the count of interactions with the respective user interface elements 742. Where the switcher menu field 744 includes persistent user interface elements 742 (such as a user interface element corresponding to a "HOME" menu item or a "PLAY" menu item), such user interface elements 742 may have a first hierarchy within the switcher menu field 742. Where the switcher menu field 744 includes dynamic user interface elements 742 (e.g., corresponding to the current state of the navigation UI 128, such as user interface elements 742 corresponding to a previous/prior/upper hierarchy of information), such dynamic user interface elements 742 may have a second hierarchy within the switcher menu field 742. Additionally, the dynamic user interface elements 742 may be ordered within the switcher menu field 744 according the respective count of interactions with the user interface elements 742 (e.g., either within the switcher menu field 744 and/or within field 724, similar to the order described above with reference to FIG. 7B). In this regard, and in some embodiments, dynamic user interface elements 742 may have a dynamic order which persists both in the field 724 and in the switcher menu field 744, when displayed therein. Where the switcher menu field 744 includes shortcut user interface elements 742 (e.g., managed or provided by the shortcut engine 118), such shortcut user interface elements 742 may be ordered within the switcher menu field 744 according the respective count of interactions with the user interface elements 742. In various embodiments, the order in which user interface elements 742 are displayed within the switcher menu field 744 may be according to a hierarchy of user interface elements 742 (e.g., with persistent user interface 742 elements arranged at a top of the switcher menu field 744, dynamic user interface elements 742 arranged beneath the persistent user interface elements 742, and shortcut user interface elements 742 arranged beneath the dynamic user interface elements). Within a particular hierarchical level, user interface elements 742 may be ordered according to their usage, as described herein.

Method for User Interface Navigation

Referring now to FIG. 8, depicted is a flowchart showing an example method 800 of user interface navigation, according to an example implementation of the present disclosure. The steps of the method 800 described herein may be executed or performed by the hardware/elements described above with reference to FIG. 1-FIG. 7C, such as the interactive computing system 102 and/or the player computing system 104. For example, where a video game application is a locally-executing video game application, the method 800 may be performed by the player computing system 104. Where the video game application is a hosted video game application, the method 800 may be performed by the interactive computing system 102. Where the video game application is a distributed video game application, some steps may be performed by the player computing system 104 while other steps may be performed by the interactive computing system 102.

At step 802, a computing system may cause display of a user interface including a horizontal set of user interface elements. In some embodiments, the computing system may cause display of a user interface including a set of first user interface elements. The user interface displayed at step 802 may be the same as or similar to the user interface 300 shown and described with reference to FIG. 3A. The set of first user interface elements may be arranged horizontally along the user interface. The set of first user interface elements may be arranged horizontally in an order which is determined according to a selection count (or count of interactions) with the respective user interface elements of the first set. For example, the set of user interface elements may be arranged horizontally from left to right, with the left-most user interface elements having a greater selection count than other user interface elements. In other words, the set of first user interface elements may be arranged or ordered in a manner similar to the user interface 720 described above with respect to FIG. 7B.

The user interface may be caused to be displayed at the player computing system 104. For example, where the interactive computing system 102 causes display of the user interface, the interactive computing system 102 may transmit, send, or otherwise provide data/information corresponding to the user interface to the player computing system 104, to cause the player computing system 104 to render and display the user interface according to the data/information from the interactive computing system. Where the player computing system 104 causes display of the user interface, the player computing system may execute the game application 122 to render and display the user interface.

In some embodiments, the user interface displayed at step 802 may be responsive to selection of an operational mode for the game application 122. For example, an initial or launch user interface may be displayed at the player computing system 104. The launch user interface may be similar to the user interface 200 of FIG. 2. The launch user interface may include a plurality of user interface elements 208 corresponding to operational modes of the game applications 122. In various embodiments, the user interface elements 208 may be ordered based on a play history of a player accessing the launch user interface (e.g., in a manner as described above with reference to FIG. 7A). In response to a selection of a respective user interface element 208 on the launch user interface, the user interface of step 802 may be displayed.

At step 804, the computing system may receive a signal indicative of a user input. In some embodiments, the computing system may receive signals indicating user inputs/interactions with a user input device 130 of the player computing system 104. For example, the player computing system 104 may receive signals corresponding to user inputs via a local communication link with the user input device 130 (e.g., as corresponding selections/interactions with the user input device 130 are made). Where the method 800 is performed by the interactive computing system 102, the player computing system 104 may transmit the signal(s) from the user input device 130 (or generate corresponding signal(s) for transmission) to the interactive computing system 102.

At step 806, the computing system may determine whether to cause expansion of a switcher menu. In some embodiments, the computing system may determine whether to cause expansion of the switcher menu based on the signal received at step 804. For example, the signal may be indicative of navigation within/between the first set of user interface elements displayed horizontally on the user interface displayed at step 802. Additionally or alternatively, the signal may be indicative of a request to expand the switcher menu. In some embodiments, the switcher menu may be launched responsive to the player selecting a hotkey on the user input device 130. The computing system may determine whether to cause expansion of the switcher menu based on whether the signal indicates navigation or selection of the hotkey.

Where, at step 806, the computing system determines that the signal is indicative of navigation within the horizontal set of user interface elements, at step 808, the computing system may cause updating of the user interface to indicate navigation within the horizontal set of user interface elements. For example, the computing system may cause highlighting, emphasizing, bolding, size increasing, etc., of respective user interface elements of the horizontal set of user interface elements, as the player navigates between the user interface elements. In various embodiments, as the player navigates within the horizontal set of user interface elements, a subset of the user interface elements may be dynamically displayed, with a remainder of the set of user interface elements being truncated as indicated by a truncation element.

Where, at step 806, the computing system determines that the signal is indicative of a request to expand the switcher menu (e.g., responsive to selection of the hotkey on the user input device 130), at step 810, the computing system may cause expansion of the switcher menu including a vertical set of user interface elements. In some embodiments, the vertical set of user interface elements may include at least one of the first user interface elements. For example, the vertical set of user interface elements included in the switcher menu may include a user interface element corresponding to the current tier/hierarchy of information (e.g., as reflected in the horizontal user interface elements) and one or more other user interface elements. The other user interface elements may correspond to a different hierarchy of information (e.g., dynamic user interface elements) and/or shortcuts (e.g., shortcut user interface elements). In some embodiments, the vertical set of user interface elements may be arranged in an order within the switcher menu, according to usage of (and/or a hierarchy of) the user interface elements. In other words, the vertical set of user interface elements may be arranged in an order similar to the arrangement/configurations described above in the user interface 740 of FIG. 7C.

In various embodiments, each of the user interface elements of the vertical set may correspond to a respective set of horizontal user interface elements. For example, as the player navigates between the user interface elements of the vertical set, the user interface element of the vertical set to which the player has navigated (e.g., the target user interface element) may be displayed with a respective horizontal set of user interface elements. In some embodiments, at step 810, expansion of the switcher menu causes the switcher menu to overlay underlying content of the user interface. For example, the switcher menu may cause the navigation region in which the switcher menu is provided, to overlay the graphical content region of the user interface.

At step 812, the computing system may receive a signal indicative of subsequent inputs. Step 812 may be similar to step 804 described above. For example, the computing system may receive the signal responsive to user interactions with the user input device 130 (e.g., by the player computing system 104 directly from the user input device 130, or by the interactive computing system 102 indirectly from the user input device 130 via the player computing system 104).

At step 814, the computing system may determine whether to cause collapsing of the switcher menu. In some embodiments, the computing system may determine whether to cause collapsing of the switcher menu, based on the signal received at step 812. For example, the computing system may determine whether the signal is indicative of a horizontal navigation input or a vertical navigation input. Vertical navigation inputs may be or include user inputs which cause navigation among the vertical set of user interface elements (e.g., by toggling up and down on a joystick, by selecting an up or down arrow on a directional keypad, etc.). Horizontal navigation inputs may be or include user inputs which cause navigation from the vertical set of user interface elements to the horizontal set of user interface elements (e.g., by toggling left or right on the joystick, by selecting a left or right arrow on the directional keypad, by selecting a left or right bumper of the user input device 130, by selecting a particular vertical user interface element, etc.).

Where, at step 814, the computing system determines that the signal is indicative of a vertical navigation input, at step 816, the computing system may cause updating of the horizontal set of user interface elements. In some embodiments, the computing system may cause, responsive to navigating from a first user interface element of the vertical set to a second user interface element of the vertical set, display of a set of horizontal user interface elements corresponding to the second user interface element. For example, the computing system may cause display of the set of horizontal user interface elements corresponding to the second user interface element, by replacing the previous set of horizontal user interface elements (e.g., corresponding to the first user interface element) with the current set of horizontal user interface elements (e.g., corresponding to the second user interface element). In this regard, as the player navigates among the vertical set of user interface elements, the horizontal user interface elements are correspondingly updated to correspond to the target user interface element of the vertical set to which the player has navigated.

Where, at step 814, the computing system determines that the signal is indicative of a horizontal navigation input, at step 818, the computing system may cause collapsing of the switcher menu. In some embodiments, the computing system may cause collapsing of the switcher menu in response to the signal indicating a request to navigate, from the switcher menu to one of the set of horizontal user interface elements. The computing system may cause collapsing of the switcher menu, to display the selected user interface element from the vertical set, with at least some of the horizontal set of user interface elements.

The computing system may cause collapsing of the switcher menu based on or according to a type of user input indicated by the signal received at step 814. For example, the computing system may cause collapsing of the switcher menu responsive to receiving a signal indicative of toggling left or right on the joystick of the user input device 130. As another example, the computing system may cause collapsing of the switcher menu responsive to receiving a signal indicative of a selection of a left or right arrow on the directional keypad of the user input device 130. As yet another example, the computing system may cause collapsing of the switcher menu responsive to receiving a signal indicative of a selection of a left or right bumper of the user input device 130. As still another example, the computing system may cause collapsing of the switcher menu responsive to receiving a signal indicative of a selection of a particular button of the user input device 130 for selecting the corresponding vertical user interface element.

The computing system may cause collapsing of the switcher menu, to display underlying content of the user interface. As stated above, expansion of the switcher menu may cause the navigation region of the user interface to overlay a graphical content region of the user interface. Correspondingly, collapsing of the switcher menu may cause exposure (or display) of the graphical content region of the user interface. In some embodiments, collapsing of the switcher menu restricts presentation of various user interface elements of the vertical set. For example, when the computing system cause collapsing of the switcher menu responsive to selection of a particular user interface element (e.g., either by way of navigating to horizontal user interface elements which correspond to the particular user interface element or by way of a positive selection made via the user input device), the switcher menu may be collapsed such that the switcher menu user interface element is limited to the particular user interface element which was selected. In this regard, other vertical user interface elements may be omitted from display, responsive to collapsing of the switcher menu.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of ±10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other example embodiments, and that such variations are intended to be encompassed by the present disclosure.

What is claimed is:

1. A system, comprising:
a data store configured to store video game data corresponding to a video game; and
a computing system communicably coupled with the data store and configured to execute computer-readable instructions that configure the computing system to:
cause, at a player computing system, display of a user interface comprising a set of first user interface elements identified from the video game data;
receive a request to expand a switcher menu comprising a set of second user interface elements including at least one of the first user interface elements, wherein each second user interface element, when selected within the switcher menu, is displayed with one or more respective third user interface elements;
cause, responsive to a request to navigate from one second user interface element to another second user interface element of the switcher menu, display of a set of third user interface elements corresponding to the another second user interface element;
determine, based on a user profile associated with a user accessing the user interface, a selection count for respective third user interface elements of the set of third user interface elements, each third user interface element corresponding to a respective play mode of the video game, wherein the third set of user interface elements are displayed in an order, according to the selection count; and
cause, responsive to a second request to navigate, from the switcher menu to one of the set of third user interface elements, the switcher menu to collapse and display the another second user interface element with at least some of the set of third user interface elements.

2. The system of claim 1, wherein collapsing of the switcher menu restricts presentation of other ones of the second user interface elements of the set of second user interface elements.

3. The system of claim 1, wherein expansion of the switcher menu causes the switcher menu to overlay underlying content of the user interface, and wherein collapsing of the switcher menu causes display of the underlying content of the user interface.

4. The system of claim 1, wherein the switcher menu further comprises a list of shortcut user interface elements corresponding to one or more operational modes, menu items for a respective operational mode, or sub-menu items.

5. The system of claim 1, wherein the set of first user interface elements are arranged along a first axis of the user interface, the set of second user interface elements are arranged along a second axis of the user interface, and the set of third user interface elements are arranged along the first axis of the user interface.

6. The system of claim 5, wherein cause display of the set of third user interface elements corresponding to the another second user interface element is performed by replacing the set of first user interface elements with the set of third user interface elements along the first axis.

7. The system of claim 1, wherein the computer-readable instructions further configure the computing system to cause display of a set of fourth user interface elements corresponding to respective operational modes of the video game.

8. The system of claim 7, wherein the computer-readable instructions further configure the computing system to:
determine, based on the user profile associated with the user accessing the user interface, a duration of gameplay in respective operational modes of the video game; and
cause display of the set of fourth user interface elements in an order, according to the duration of gameplay.

9. The system of claim 1, wherein, as the set of third user interface elements are navigated between, one or more of the set of third user interface elements are truncated, the user interface including a truncation element aligned with the remaining third user interface elements, the truncation element indicating a direction of the one or more truncated third user interface elements.

10. The system of claim 1, wherein the request to expand, the first request to navigate and the second request to navigate are received based on user inputs to an input device comprising a controller, and wherein the request to expand is received in response to selection of a hotkey on the controller.

11. The system of claim 1, wherein the system causes display of the switcher menu at a player computing system.

12. A method, comprising:
causing, by a computing system, display of a user interface comprising a set of first user interface elements identified from video game data;
receiving, by the computing system, a request to expand a switcher menu comprising a set of second user interface elements including at least one of the first user interface elements, wherein each second user interface element, when selected within the switcher menu, is displayed with one or more respective third user interface elements;
causing, by the computing system, responsive to a first request to navigate from one second user interface element to another second user interface element of the switcher menu, display of a set of third user interface elements corresponding to the another second user interface element;
determining, by the computing system, based on a user profile associated with a user accessing the user interface, a selection count for respective third user interface elements of the set of third user interface elements, each third user interface element corresponding to a respective play mode of a video game, wherein the third set of user interface elements are displayed in an order, according to the selection count; and causing, by the first computing system, responsive to a second request to navigate, from the switcher menu to one of the set of third user interface elements, the switcher menu to collapse and display the another second user interface element with at least some of the set of third user interface elements.

13. The method of claim 12, wherein expansion of the switcher menu causes the switcher menu to overlay underlying content of the user interface, and wherein collapsing of the switcher menu causes display of the underlying content of the user interface.

14. The method of claim 12, wherein the switcher menu further comprises a list of shortcut user interface elements corresponding to one or more operational modes, menu items for a respective operational mode, or sub-menu items.

15. The method of claim 12, wherein the set of first user interface elements are arranged along a first axis of the user interface, the set of second user interface elements are arranged along a second axis of the user interface, and the set of third user interface elements are arranged along the first axis of the user interface, and wherein causing display of the set of third user interface elements corresponding to the another second user interface element comprises replacing the set of first user interface elements with the set of third user interface elements along the first axis.

16. The method of claim 12, further comprising:

determining, by the computing system, based on the user profile associated with the user accessing the user interface, a duration of gameplay in respective operational modes of the video game; and causing, by the first computing system, display of a set of fourth user interface elements in an order, according to the duration of gameplay.

17. The method of claim 12, wherein, as the set of third user interface elements are navigated between, one or more of the set of third user interface elements are truncated, the user interface including a truncation element aligned with the remaining third user interface elements, the truncation element indicating a direction of the one or more truncated third user interface elements.

18. A non-transitory computer readable medium storing instructions that, when executed by a computing system, cause the computing system to:

cause display of a user interface comprising a set of first user interface elements identified from video game data;

receive a request to expand a switcher menu comprising a set of second user interface elements including at least one of the first user interface elements, wherein each second user interface element, when selected within the switcher menu, is displayed with one or more respective third user interface elements;

cause, responsive to a first request to navigate from one second user interface element to another second user interface element of the switcher menu, display of a set of third user interface elements corresponding to the another second user interface element;

determine, based on a user profile associated with a user accessing the user interface, a selection count for respective third user interface elements of the set of third user interface elements, each third user interface element corresponding to a respective play mode of a video game, wherein the third set of user interface elements are displayed in an order, according to the selection count; and cause, responsive to a second request to navigate, from the switcher menu to one of the set of third user interface elements, the switcher menu to collapse and display the another second user interface element with at least some of the set of third user interface elements.

* * * * *